(12) United States Patent
Bharadwaj et al.

(10) Patent No.: US 12,446,064 B2
(45) Date of Patent: *Oct. 14, 2025

(54) HANDLING PACKETS WITH DIFFERENT PRIORITIES IN SIDELINK SYSTEMS

(71) Applicant: QUALCOMM Incorporated, San Diego, CA (US)

(72) Inventors: Arjun Bharadwaj, Cupertino, CA (US); Tien Viet Nguyen, Bridgewater, NJ (US); Kapil Gulati, Belle Mead, NJ (US); Sudhir Kumar Baghel, Pleasanton, CA (US)

(73) Assignee: Qualcomm Incorporated, San Diego, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 17/866,280

(22) Filed: Jul. 15, 2022

(65) Prior Publication Data

US 2022/0361192 A1    Nov. 10, 2022

Related U.S. Application Data

(63) Continuation of application No. 16/737,844, filed on Jan. 8, 2020, now Pat. No. 11,395,313.
(Continued)

(51) Int. Cl.
*H04W 72/566* (2023.01)
*H04L 5/00* (2006.01)
(Continued)

(52) U.S. Cl.
CPC ......... *H04W 72/569* (2023.01); *H04L 5/0055* (2013.01); *H04W 28/26* (2013.01);
(Continued)

(58) Field of Classification Search
None
See application file for complete search history.

(56) References Cited

U.S. PATENT DOCUMENTS

| 9,867,187 B2 | 1/2018 | Wei et al. |
| 2015/0085791 A1 | 3/2015 | Baghel et al. |

(Continued)

FOREIGN PATENT DOCUMENTS

| CN | 106797644 A | 5/2017 |
| CN | 107005828 A | 8/2017 |

(Continued)

OTHER PUBLICATIONS

Fujitsu: "Resource Allocation for NR V2X Sidelink Communication", 3GPP TSG RAN WG1 Meeting #95bis, 3GPP Draft, R1-1812410, Resource Allocation for NR V2X Sidelink Communication Final, 3rd Generation Partnership Project (3GPP), Mobile Competence Centre, 650, Route Des Lucioles, F-06921 Sophia-Antipolis, vol. Ran WG2, No. Spokane, United States, Nov. 12, 2018-Nov. 16, 218, Nov. 2, 2018 (Nov. 2, 2018), XP051478610, 9 Pages, Proposal 7.
(Continued)

*Primary Examiner* — Nicholas Sloms
(74) *Attorney, Agent, or Firm* — Holland & Hart LLP

(57) ABSTRACT

Methods, systems, and devices for wireless communications are described. In some systems (e.g., sidelink systems, such as vehicle-to-everything (V2X) systems), wireless devices may perform dynamic resource reservations to schedule packet transmissions (e.g., data packet transmissions). Different packets may correspond to different priority levels. To support flexible resource reservation for high priority packets, wireless devices may implement techniques for pre-empting lower priority reservations. For example, a wireless device may identify reservations for transmitting different packets during a same transmission time interval (TTI). The device may determine whether a first or second packet has
(Continued)

a higher relative priority and may communicate in the V2X system during the TTI according to the relative priorities. For example, a device that reserved the TTI for the lower priority packet may refrain from transmitting the packet during the TTI, while a device that reserved the TTI for the higher priority packet may transmit the packet.

16 Claims, 13 Drawing Sheets

Related U.S. Application Data

(60) Provisional application No. 62/790,885, filed on Jan. 10, 2019.

(51) Int. Cl.
*H04W 28/26* (2009.01)
*H04W 72/0446* (2023.01)
*H04W 72/51* (2023.01)
*H04W 4/70* (2018.01)

(52) U.S. Cl.
CPC ....... *H04W 72/0446* (2013.01); *H04W 72/51* (2023.01); *H04W 4/70* (2018.02)

(56) References Cited

U.S. PATENT DOCUMENTS

| | | |
|---|---|---|
| 2016/0150520 A1 | 5/2016 | Fodor et al. |
| 2018/0070371 A1 | 3/2018 | Shin et al. |
| 2018/0167945 A1 | 6/2018 | Cao et al. |
| 2018/0255532 A1 | 9/2018 | Li et al. |
| 2018/0316395 A1* | 11/2018 | Sundararajan ........ H04L 5/0053 |
| 2018/0332564 A1 | 11/2018 | Lee et al. |
| 2019/0053215 A1 | 2/2019 | Yu et al. |
| 2019/0058986 A1* | 2/2019 | Loehr .................. H04L 1/1825 |
| 2019/0075548 A1 | 3/2019 | Lee et al. |
| 2019/0141647 A1 | 5/2019 | Nimbalker et al. |
| 2019/0182840 A1* | 6/2019 | Feng ................. H04W 74/0816 |
| 2019/0191461 A1 | 6/2019 | Lee et al. |
| 2019/0364562 A1* | 11/2019 | Chae ................. H04W 72/0466 |
| 2019/0373637 A1 | 12/2019 | Lee et al. |
| 2019/0387377 A1 | 12/2019 | Zhang et al. |
| 2020/0008266 A1 | 1/2020 | Pan et al. |
| 2020/0029340 A1 | 1/2020 | He et al. |
| 2020/0068534 A1* | 2/2020 | Li ..................... H04W 74/0808 |
| 2020/0106566 A1 | 4/2020 | Yeo et al. |
| 2020/0154397 A1* | 5/2020 | Kim ...................... H04W 72/02 |
| 2020/0178256 A1 | 6/2020 | Tang |
| 2020/0196310 A1 | 6/2020 | Tang |
| 2020/0229210 A1 | 7/2020 | Bharadwaj et al. |
| 2020/0275458 A1 | 8/2020 | Khoryaev et al. |
| 2020/0314803 A1 | 10/2020 | Zhang et al. |
| 2020/0351057 A1* | 11/2020 | Yeo ........................ H04L 1/1854 |
| 2021/0127365 A1 | 4/2021 | Wang et al. |
| 2021/0160817 A1* | 5/2021 | Khoryaev ........... H04W 72/542 |
| 2022/0086801 A1* | 3/2022 | Miao ................. H04W 72/0446 |
| 2024/0204926 A1* | 6/2024 | Guo ....................... H04L 5/0051 |

FOREIGN PATENT DOCUMENTS

| | | |
|---|---|---|
| WO | WO-2018031086 A1 | 2/2018 |
| WO | WO-2018031172 A1 | 2/2018 |
| WO | WO-2018160372 A1 | 9/2018 |

OTHER PUBLICATIONS

Fujitsu: "Resource Allocation for NR V2X Sidelink Communication considering low latency requirement", 3GPP TSG RAN WG1 Meeting #94bis, R1-1810593, Chengdu, China, Oct. 8-12, 2018, 6 Pages.
OPPO: "Discussion on mode 2 resource allocation in NR-V2X", 3GPP TSG-RAN WG1 Meeting #95, R1-1812827, Spokane, USA, Nov. 12-16, 2018, 6 Pages.
CATT: "Prioritization for Autonomous Resource Selection", 3GPP Draft, 3GPP TSG RAN WG2 Meeting #91bis, R2-154051, 3rd Generation Partnership Project (3GPP), Mobile Competence Centre, 650, Route Des Lucioles, F-06921, Sophia-Antipolis Cedex, France, vol. RAN WG2, No. Malmo, Sweden; Oct. 5, 2015-Oct. 9, 2015, Oct. 4, 2015 (Oct. 4, 2015), XP051040265, 6 pages, Retrieved from the Internet: URL: http://www.3gpp.org/ftp/Meetings_3GPP_SYNC/RAN2/Docs/ [retrieved on Oct. 4, 2015], 2.1. Solutions for Associating the Priority and Resource Pool.
Intel Corporation: "QoS Consideration in FeD2D," 3GPP Draft, 3GPP TSG RAN WG2 Meeting #97bis, R2-1702992, FED2D_QOS_Intel, 3rd Generation Partnership Project (3GPP), Mobile Competence Centre, 650, Route Des Lucioles, F-06921, Sophia-Antipolis Cedex, France, vol. RAN WG2, No. Spokane, USA, Apr. 3, 2017-Apr. 7, 2017, Apr. 3, 2017 (Apr. 3, 2017), XP051244953, 4 pages, Retrieved from the Internet: URL: http://www.3gpp.org/ftp/Meetings_3GPP_SYNC/RAN2/Docs/ [retrieved on Apr. 3, 2017], 2.1 QoS enhancements for relay based sidelink.
International Preliminary Report on Patentability—PCT/US2020/012930, The International Bureau of WIPO—Geneva, Switzerland, Jul. 22, 2021.
International Search Report and Written Opinion—PCT/US2020/012930—ISA/EPO—Mar. 26, 2020.
Nokia., et al., "Discussions on NR V2X Sidelink Physical Layer Structures", 3GPP TSG RAN WG1 Meeting #95, R1-1813519, Spokane, USA, Nov. 12-16, 2018, 13 Pages, Nov. 3, 2018.

* cited by examiner

HANDLING PACKETS WITH DIFFERENT PRIORITIES IN SIDELINK SYSTEMS

CROSS REFERENCE

The present Application for Patent is a Continuation of U.S. patent application Ser. No. 16/737,844 filed in the U.S. Patent and Trademark Office on Jan. 8, 2020, the entire content of which is incorporated herein by reference as if fully set forth below in its entirety and for all applicable purposes. U.S. patent application Ser. No. 16/737,844 claims the benefit of and priority to U.S. Provisional Patent Application No. 62/790,885 by BHARADWAJ et al., entitled "HANDLING PACKETS WITH DIFFERENT PRIORITIES IN VEHICLE-TO-EVERYTHING SYSTEMS," filed Jan. 10, 2019, assigned to the assignee hereof, and expressly incorporated herein.

BACKGROUND

The following relates generally to wireless communications, and more specifically to sidelink systems, such as vehicle-to-everything (V2X) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may include or support networks used for direct communications between wireless devices, e.g., direct communications between UEs. Examples of direct communications include, but are not limited to, device-to-device (D2D) communications, vehicle-based communications, which may also be referred to as V2X networks, vehicle-to-vehicle (V2V) networks, cellular V2X (C-V2X) networks, and the like. These direct communications between UEs may be referred to as sidelink communications (e.g., in sidelink systems, such as V2X systems).

In V2X communications, there may be no central node that determines scheduling or allocation of resources for UEs in a region, where the UEs may be examples of vehicles. Instead, in some cases, communications may occur between the UEs based on semi-persistent scheduling (SPS). However, SPS may limit the size and periodicity of data packet transmissions by the UEs, resulting in inefficient transmissions and poor performance. In other cases, if UEs attempt to transmit information without SPS, the transmissions may occur at the same time, resulting in high amounts of interference when multiple UEs in close proximity attempt to transmit multiple information packets during a same transmission time interval (TTI). UEs may not be able to transmit packets and receive packets at the same time. This may result in high priority packets not being received or lower priority packets being transmitted instead of higher priority packets. Further, one UE scheduling a lower priority packet transmission may reduce the resources available for another UE to schedule a higher priority packet transmission. As such, UEs may experience significant latency when attempting to schedule and transmit important information in a V2X system.

SUMMARY

The described techniques relate to improved methods, systems, devices, and apparatuses that support handling packets with different priorities in sidelink systems, such as vehicle-to-everything (V2X) systems. Generally, the described techniques provide for improved resource utilization and scheduling flexibility for prioritizing specific data packet transmissions in systems without centralized scheduling by a node. In some wireless communications systems (e.g., systems supporting sidelink communications, such as V2X systems), wireless devices may perform dynamic resource reservations to schedule packet transmissions (e.g., data packet transmissions). In some cases, different packets may correspond to different priority levels (e.g., time-sensitive or emergency information may be transmitted in high priority packets). To support flexible resource reservation for high priority packets, wireless devices may implement techniques for preempting lower priority reservations.

For example, a wireless device may identify reservations for transmitting different data packets during a same transmission time interval (TTI), such as a same slot, symbol, or sub-slot. The device may determine whether a first or second packet has a higher relative priority and may communicate in the V2X system during the TTI according to the relative priorities. For example, a device that reserved the TTI for the lower priority data packet may refrain from transmitting the packet during the TTI and instead may monitor for a higher priority packet, while a device that reserved the TTI for the higher priority data packet may transmit the packet in the TTI. In this way, the device scheduling the higher priority data packet may schedule the transmission in resources previously reserved for a lower priority transmission. The other devices in the system may identify the preempting, high-priority transmission and may yield the resources, allowing for reliable, low-latency transmission of the high-priority data packet.

A method for wireless communications is described. The method may include identifying, by a first wireless device in a sidelink system, a first packet for transmission during a TTI within the sidelink system, determining that a second packet is reserved for transmission by a second wireless device during at least a portion of the TTI within the sidelink system, determining whether the first packet or the second packet has a higher relative priority, and communicating in the sidelink system during the TTI by either transmitting the first packet or receiving the second packet based on which of the first packet or the second packet has the higher relative priority.

An apparatus for wireless communications is described. The apparatus may include a processor, memory in electronic communication with the processor, and instructions stored in the memory. The instructions may be executable by the processor to cause the apparatus to identify, by a first wireless device in a sidelink system, a first packet for transmission during a TTI within the sidelink system, determine that a second packet is reserved for transmission by a second wireless device during at least a portion of the TTI within the sidelink system, determine whether the first packet or the second packet has a higher relative priority, and communicate in the sidelink system during the TTI by either transmitting the first packet or receiving the second packet based on which of the first packet or the second packet has the higher relative priority.

Another apparatus for wireless communications is described. The apparatus may include means for identifying, by a first wireless device in a sidelink system, a first packet for transmission during a TTI within the sidelink system, means for determining that a second packet is reserved for transmission by a second wireless device during at least a portion of the TTI within the sidelink system, means for determining whether the first packet or the second packet has a higher relative priority, and means for communicating in the sidelink system during the TTI by either transmitting the first packet or receiving the second packet based on which of the first packet or the second packet has the higher relative priority.

A non-transitory computer-readable medium storing code for wireless communications is described. The code may include instructions executable by a processor to identify, by a first wireless device in a sidelink system, a first packet for transmission during a TTI within the sidelink system, identify that a second packet is reserved for transmission by a second wireless device during at least a portion of the TTI within the sidelink system, determine whether the first packet or the second packet has a higher relative priority, and communicate in the sidelink system during the TTI by either transmitting the first packet or receiving the second packet based on which of the first packet or the second packet has the higher relative priority.

DETAILED DESCRIPTION

Figure 1:
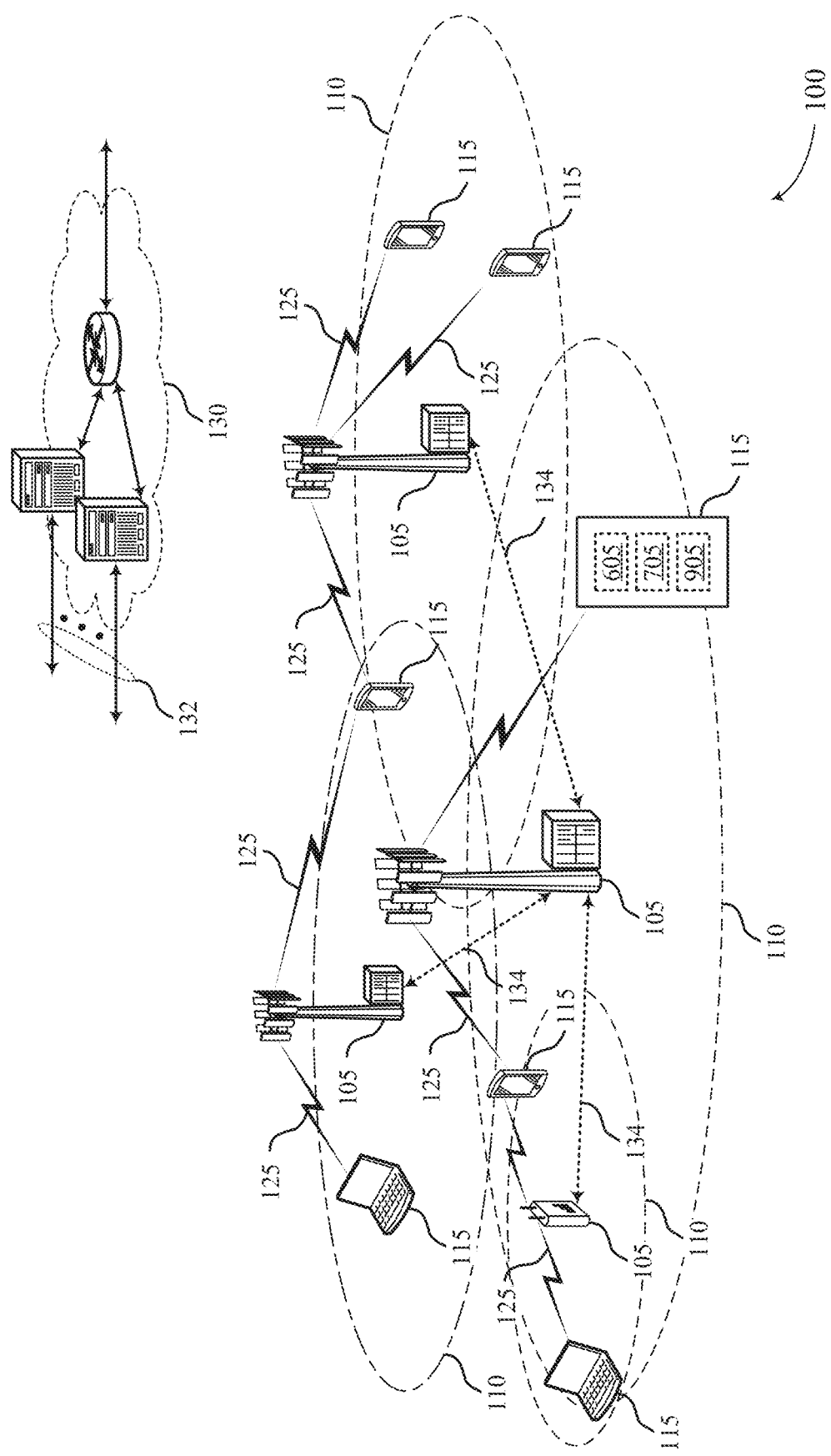
FIGS. 1 through 3 illustrate examples of wireless communications systems that support handling packets with different priorities in sidelink systems in accordance with aspects of the present disclosure.

User equipments (UEs) in a sidelink communications system, such as a vehicle-to-everything (V2X) communications system, may communicate by transmitting packets in a designated frequency spectrum. The UEs in the V2X system may be examples of vehicles (e.g., smart vehicles) communicating with other vehicles, infrastructure, networks, or devices. The UEs may transmit packets of different sizes at periodic or aperiodic times. In order to accommodate packets of varying sizes, a UE may modify the allocated time designated for a packet, modify the allocated frequency for the packet, utilize a slot aggregation and/or allocation system, or perform some combination of these techniques. The UEs may perform dynamic scheduling of packet transmissions in the system using reservations (e.g., either sent in control signaling or in other data packets). To efficiently manage data packets with different priorities in the system, the UEs may implement one or more techniques for prioritizing transmissions of high priority data packets.

For example, a UE may identify a high priority packet (e.g., a high priority data packet) to transmit in the V2X system. The UE may additionally determine a latency constraint for transmitting the high priority data packet. In some cases, the UE may not identify any available block of resources for transmitting the packet within a time frame that meets the latency constraint. In some such cases, the UE may preempt another reservation for transmission of a relatively lower priority packet within this time frame, allowing for low latency transmission of the high priority data packet. Additionally, the low priority packet transmission may be dropped due to the preemption procedure, improving the reliability of the high priority data packet transmission.

In order to support preemption of lower priority packets in the V2X system, the UE may utilize one or more techniques. A first technique may involve a first UE reserving resources for a re-transmission or for a later segment of a high priority packet by preempting a lower priority transmission. The first UE may identify a lower priority reservation and may preempt the corresponding low priority packet transmission if the first UE does not identify other available resources for the reservation. The first UE may schedule the higher priority transmission for resources overlapping this lower priority transmission, and a second UE that reserved the resources for the lower priority transmission may yield the resources to the first UE (e.g., based on identifying the reservation for the higher priority transmission). In some cases, the first UE may identify multiple lower priority reservations. The first UE may determine which lower priority reservation to preempt based on which lower priority reservation has a lower received signal strength measurement at the first UE.

A second technique may involve a first UE reserving resources for an initial transmission of a high priority packet using resources designated for negative acknowledgment (NACK) messaging. For example, the first UE may transmit a dedicated sequence in the NACK field indicating a subsequent high priority transmission (e.g., within a preemption time period or time window following the NACK field). If a second UE has scheduled a transmission, such as a relatively lower priority packet transmission, in the preemption time period, the second UE may refrain from transmitting a NACK in the NACK field and instead may monitor for any preempting high priority reservation. If the second UE detects the high priority reservation transmitted by the first UE, the second UE may yield the resources. In this way, the first UE may reliably transmit the initial transmission of the high priority data packet with low latency within the preemption time period.

Aspects of the disclosure are initially described in the context of a wireless communications system. Additional aspects of the disclosure are described with reference to V2X systems, resource assignments, and a process flow. Aspects of the disclosure are further illustrated by and described with reference to apparatus diagrams, system diagrams, and flowcharts that relate to handling packets with different priorities in V2X systems.

FIG. 1 illustrates an example of a wireless communications system 100 that supports handling packets with different priorities in sidelink systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. For example, a UE 115 may be an example of a smart vehicle or a component of a vehicle in a V2X system. In some cases, the UEs 115 may include aspects of a device 605, a device 705, or a device 905, as described herein.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105. For example, in some systems, UEs 115 may communicate with other UEs 115 over sidelink channels without the aid of scheduling or resource allocation by a central node, such as a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide re-transmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support re-transmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and re-transmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots (i.e., sub-slots) containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105. As such, the term "TTI" may refer to a symbol, a sub-slot, a slot, or an aggregated set of symbols, sub-slots, or slots.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems 100, wireless devices may perform dynamic resource selections to schedule packet transmissions (e.g., data packet transmissions, control packet transmissions, etc.). These wireless devices may be examples of UEs 115, such as smart vehicles in a V2X system. In some cases, different data packets may correspond to different priority levels (e.g., time-sensitive or emergency information may be transmitted in high priority packets). To support flexible resource reservation for high priority data packets, wireless devices may implement techniques for preempting lower priority reservations. For example, a UE 115 may identify reservations for transmitting different data packets during a same TTI. The UE 115 may determine whether a first or second packet has a higher relative priority and may communicate in the V2X system during the TTI according to the relative priorities. For example, a UE 115 that reserved the TTI for the lower priority data packet may refrain from transmitting the packet during the TTI and instead may monitor for a higher priority packet, while a UE 115 that reserved the TTI for the higher priority data packet may transmit the packet in the TTI. In this way, the UE 115 scheduling the higher priority data packet may schedule the transmission in resources previously reserved for a lower priority transmission (e.g., if no other resources are available). The other devices in the system (e.g., UEs 115, base stations 105, etc.) may identify the preempting, high-priority transmission and may yield the resources, allowing for reliable, low-latency transmission of the high-priority data packet.

Figure 2:
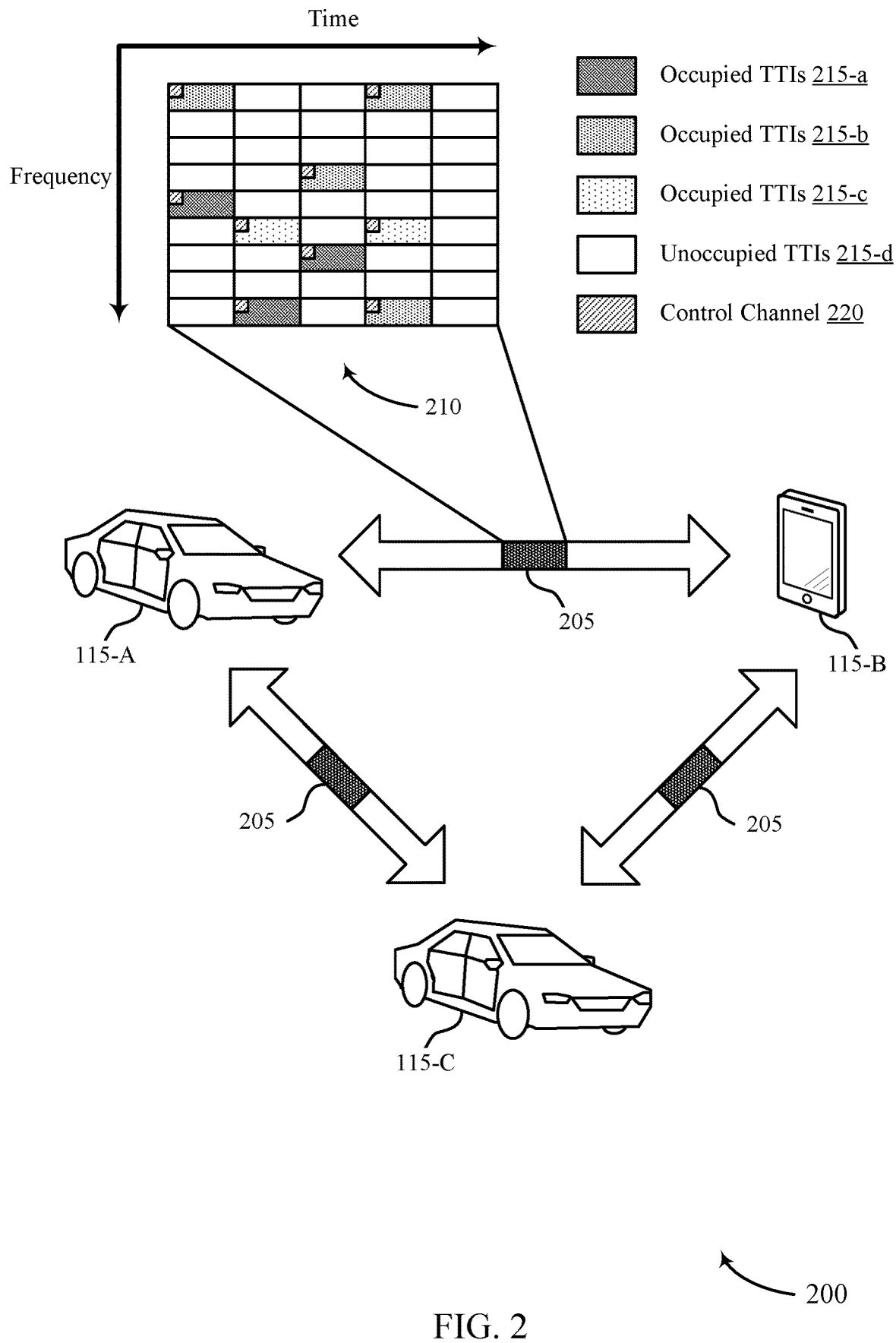

FIG. 2 illustrates an example of a wireless communications system 200 that supports handling packets with different priorities in sidelink systems in accordance with aspects of the present disclosure. In some examples, wireless communications system 200 may implement aspects of wireless communications system 100 and may include UEs 115-a, 115-b, and 115-c, which may be examples of UEs 115 described with reference to FIG. 1. In some cases, UEs 115-a, 115-b, and 115-c may communicate with each other within a V2X system (e.g., using sidelink communications 205) and may employ a resource scheduling interference avoidance scheme to dynamically select and use transmission resources.

According to some aspects, UE 115-a may attempt to decode sidelink transmissions 205 from UEs 115-b and 115-c in order to maintain accurate system information (e.g., vehicle data, scheduled resources, etc.). UE 115-a may construct a resource map 210 or otherwise track available resource candidates for transmitting packets, such as data packets. For example, a resource map 210 may be stored in memory at a UE 115 to construct a set of available candidate resources for the UE 115 to use for scheduling transmissions. In some cases, sidelink transmissions 205 may include a control channel 220. UE 115-a may decode signals on the control channel 220 to determine which resources within the V2X frequency band are reserved or occupied by UEs 115-b and 115-c, respectively. In some examples, transmissions on a control channel 220 may indicate a length of a transmission (e.g., initial transmission length and/or total transmission length) which may, in some cases, remain the same for any subsequent transmission (e.g., re-transmission). Additionally or alternatively, UE 115-a may use current and previous reservation information to construct a resource map 210, which may indicate resources (e.g., TTIs 215-a, 215-b, and 215-c, resource blocks, or a combination thereof) that are occupied by UEs 115-a, 115-b, and 115-c, respectively, and may also indicate unoccupied resources (e.g., unoccupied TTIs 215-d). In some cases, UE 115-a may use the resource map 210 to select resources (e.g., one or more TTIs 215) to use for its own sidelink transmissions 205, which may also be selected based on an interference avoidance scheme. In some other cases, UE 115-a may track the information presented in the resource map 210 (e.g., a set of candidate resources for scheduling by UE 115-a) in memory in some other format, such as a candidate list of resources for low priority transmissions, a candidate list of resources for high priority transmissions, a candidate list of resources with associated priority values, or some combination thereof.

Transmissions on a control channel 220 from UE 115-a may include a reservation indication to reserve resources for future transmissions. In some cases, a first resource reservation for a data packet may indicate resources to be used for a following transmission, such as a re-transmission and/or a transmission of subsequent data corresponding to the same data packet. In some examples, a resource reservation subsequent to the first resource reservation for a data packet may be used to indicate resources reserved for re-transmission. In some cases, UE 115-a may indicate resource reservations using a slot index and a subchannel index. The slot index may include a defined number of bits (e.g., six bits), a subchannel index may include a different defined number of bits (e.g., four bits), and the overall reservation indication may contain a total of the slot index bits and subchannel index bits (e.g., 10 bits). In some examples, the slot index may indicate a reservation for a slot (e.g., a TTI 215) corresponding to a specified number of slots following a control channel 220 of a transmission. Additionally or alternatively, the slot index may indicate a reservation for a slot (e.g., a TTI 215) corresponding to a specified number of slots following the last slot of the transmission. The subchannel index may indicate a reservation for a subchannel corresponding to a specified number of subchannels from the start or from the end of a subchannel resource pool. In some cases, the subchannel may be defined as a given amount (e.g., minimum or maximum) of a frequency spectrum that a transmission resource (e.g., TTI 215) may occupy. That is, the subchannel may indicate the frequency resources or RBs in a TTI 215 occupied by a scheduled transmission.

UE 115-a may select transmission resources by defining a window for resource selection within the V2X transmission resources (e.g., using a resource map 210 or some other list of candidate resources). For example, UE 115-a may define a window based on whether a transmission is an initial transmission or a re-transmission, based on latency thresholds or requirements of a data packet, based on a soft-buffer threshold or requirement of UE 115-a (e.g., UE 115-a may store data for up to 16 ms, after which the UE 115-a may stop storing the data for transmission), or based on some combination of these parameters. Within the defined window, UE 115-a may select one or more TTIs 215 for transmission by identifying one or more candidate TTIs 215. For example, UE 115-a may identify TTIs 215-b (e.g., resources occupied by UE 115-b) and TTIs 215-c (e.g., resources occupied by UE 115-c) and may determine to exclude these resources from selection based on the resources being occupied. UE 115-a may remove such resources from a set of candidate resources for selection by UE 115-a for transmission scheduling. Additionally or alternatively, UE 115-a may identify candidate TTIs 215 based on a distance between UE 115-a and either UE 115-b or 115-c. For example, if UE 115-c has reserved TTIs 215-c, but UE 115-c is beyond a threshold distance from UE 115-a (e.g., as indicated in a transmission on a control channel 220), UE 115-a may identify TTIs 215-c as candidate resources. In some cases, UE 115-a may also identify candidate TTIs 215 based on a latency requirement of a data packet to be sent. For example, UE 115-a may schedule transmissions according to a latency threshold and may identify TTIs 215 that satisfy the threshold.

In some examples, UE 115-a may select resources based on a hierarchy of rules (e.g., an interference avoidance scheme) and determined candidate resources (e.g., using a resource map 210 or another scheme for tracking occupied resources). In some cases, UE 115-a may first attempt to randomly select an unoccupied TTI 215-d that may not coincide in time with any other reserved TTI 215-a, 215-b, or 215-c (e.g., in order to avoid half duplex effects), where the TTIs 215 as described herein correspond to one or more frequency resources (e.g., one or more RBs) within a time resource (e.g., a symbol, sub-slot, a slot, etc.). For example, UE 115-a may select an unoccupied TTI 215-d from the last column (e.g., right-hand column) of resource map 210 or from another column that includes unoccupied TTIs 215-d. Additionally or alternatively, an earlier unoccupied TTI 215-d may be preferred over a later unoccupied TTI 215-d (e.g., instead of the selection process being completely random). For example, in some cases, UE 115-a may select the earliest unoccupied TTI 215-d that does not coincide in time with another TTI 215-d.

In some cases, UE 115-a may be unable to transmit on or unable to find an unoccupied TTI 215-d that does not coincide in time with other transmissions. Instead, UE 115-a may proceed to select unoccupied TTIs 215-d that may be multiplexed in frequency with re-transmissions from UE 115-b or 115-c, where the re-transmissions may correspond to original transmissions that UE 115-a may have successfully decoded. For example, UE 115-a may determine (e.g., from decoding a control channel 220) that TTIs 215-b and 215-c within the second-to-last column of resource map 210 are re-transmissions and may further determine that UE 115-a has already successfully decoded the original transmissions corresponding to these re-transmissions. As such, UE 115-a may proceed to select an unoccupied TTI 215-d within the second-to-last column of resource map 210, such that UE 115-a selects one or more unoccupied resources multiplexed in frequency with occupied resources.

Additionally or alternatively, UE 115-a may be unable to transmit on or unable to find an unoccupied TTI 215-d after attempting the above techniques. Instead, UE 115-a may determine to randomly select any unoccupied TTI 215-d of the appropriate size for its own transmissions. Additionally or alternatively, UE 115-a may determine to preempt resources of a lower priority, where the resource priority may be determined from decoding a control channel 220. For example, UE 115-a may determine to preempt one or more TTIs 215-b for scheduling its own transmissions and may indicate this intention in a control channel 220 associated with the transmissions. As such, UE 115-b may decode the control channel 220 transmitted by UE 115-a (e.g., as part of constructing a resource map 210), may determine that UE 115-a is preempting resources on one or more TTIs 215-b, and may release the preempted resources. In some cases, UE 115-a may identify lower priority resources for preemption based on a signal strength (e.g., received signal strength indicator (RSSI), reference signal received power (RSRP)) of the transmissions corresponding to the resources. For example, UE 115-a may identify transmissions with a relatively lower signal strength as lower priority (e.g., because the low signal strength may indicate the transmitting device may be located beyond a certain distance from UE 115-a).

In some cases, lower priority TTIs 215-b or 215-c may not be available for UE 115-a to preempt (e.g., within the determined window), and instead UE 115-a may revise the distance metric used to identify candidate resources. For example, as UE 115-a decodes transmissions on control channels 220 from UEs 115-b and 115-c (e.g., as a part of constructing resource map 210), UE 115-a may determine that either UE 115-b or 115-c is transmitting from beyond a specified distance (e.g., beyond the revised distance metric). As such, UE 115-a may determine to include candidate resources transmitted from beyond the revised distance metric when selecting resources. Additionally or alternatively, UE 115-a may relax a criteria for candidate resources such as a signal strength (e.g., RSSI, RSRP), such that UE 115-a may consider occupied TTIs 215-b or 215-c with a signal strength below a particular threshold (e.g., which may indicate a transmission location beyond a specific distance from UE 115-a) as a candidate resource for transmitting data. In some cases, UE 115-a may extend its window for resource selection (e.g., using a configuration for UE 115-a) based on whether soft-buffer bits may be available or based on latency constraints (e.g., latency constraints may not be rigid). Using the adjusted criteria (e.g., distance metric, signal strength, window size, or some combination thereof), UE 115-a may determine to repeat the steps described above for resource selection using an interference avoidance scheme.

In some cases, TTIs 215-a, 215-b, and 215-c may contain resources dedicated to HARQ feedback, which all other UEs 115 may decode (e.g., as part of constructing a resource map 210). In some examples, a transmitting UE 115-a may not receive any NACK feedback from either UE 115-b or 115-c regarding a sidelink transmission 205 (e.g., corresponding to one or more TTIs 215-a) and may therefore determine to release any TTIs 215-a reserved for re-transmission. UEs 115-b and 115-c may infer that the re-transmission resources are released based on the UEs 115 detecting no NACK feedback in the NACK feedback resources. Additionally or alternatively, UE 115-*a* may receive a NACK corresponding to the sidelink transmission 205 and may therefore determine to continue re-transmitting on any reserved re-transmission resources (e.g., resource maps 210 may therefore remain unchanged). In some examples, UE 115-*a* may be unable to process a NACK (e.g., due to collisions or results of the half duplex constraint) and may determine to continue to transmit on the resources reserved for re-transmission (e.g., if the received power level is above a threshold). Additionally or alternatively, if UE 115-*a* is unable to process a NACK but determines that a received power level is below a given threshold (e.g., indicating that a UE 115 transmitting a NACK may be beyond a certain distance), UE 115-*a* may determine to release its re-transmission resources. In some cases, the action to be taken by a UE 115 may be a part of the configuration of said UE 115 (e.g., based on UE capability).

In some examples of V2X communications systems, UE 115-*a* may select frequency resources (e.g., subchannels) on predefined subchannel indices and may additionally select frequency resources according to a priority (e.g., in order to minimize collisions among data packets employing FDM). For example, for data packets within a 20 MHz band that occupy 10 MHz each, a UE 115 may have two subchannel indices from which to choose resources, and each 10 MHz subchannel may be assigned an equal priority. Additionally or alternatively, for data packets within a 20 MHz band that occupy 5 MHz each, the UE 115 may have four subchannel indices from which to choose resources. In this example, subchannels corresponding to 0 MHz and 10 MHz may have a highest priority for selection, while subchannels corresponding to 5 MHz and 15 MHz may have a secondary priority.

To improve reliability of packet decoding, the UEs 115 in the V2X system may transmit data packets more than once. For each of the transmissions of a packet (e.g., an initial transmission and any number of re-transmissions or repetitions), a first UE 115 may select the resources for transmitting the packet based on control exclusion, resource avoidance, reservation indications, or any combination of these or similar techniques. The first UE 115 may maintain a resource map 210 based on its own reservations and the reservations received from other UEs 115 in the system. The first UE 115 may update the resource map based on any newly received reservations. In some cases, the first UE 115 may use this map to determine resources to reserve for data packet transmissions.

Some data packets may be high priority data transmissions. In order to select a TTI for transmission of a high priority data packet (e.g., according to one or more low latency constraints for transmitting high priority data packets), the first UE 115-*a* may implement different methods of preempting lower priority resource reservations indicated in this resource map 210. Preemption may involve the transmission of a higher priority data packet that replaces, overrides, or usurps the transmission of a lower priority data packet in the same resources (e.g., in at least a portion of an overlapping TTI 215). A first method of preemption scheduling may include the first UE 115-*a* reserving resources for re-transmissions of high priority data packets in resources previously reserved for lower priority data packets. A second method of preemption scheduling may include the first UE 115-*a* reserving resources for initial transmissions of high priority data packets using resources dedicated for NACK signaling. Transmitting the preempting high priority reservation in the NACK region may support low latency scheduling of an initial high priority transmission.

Figure 3:
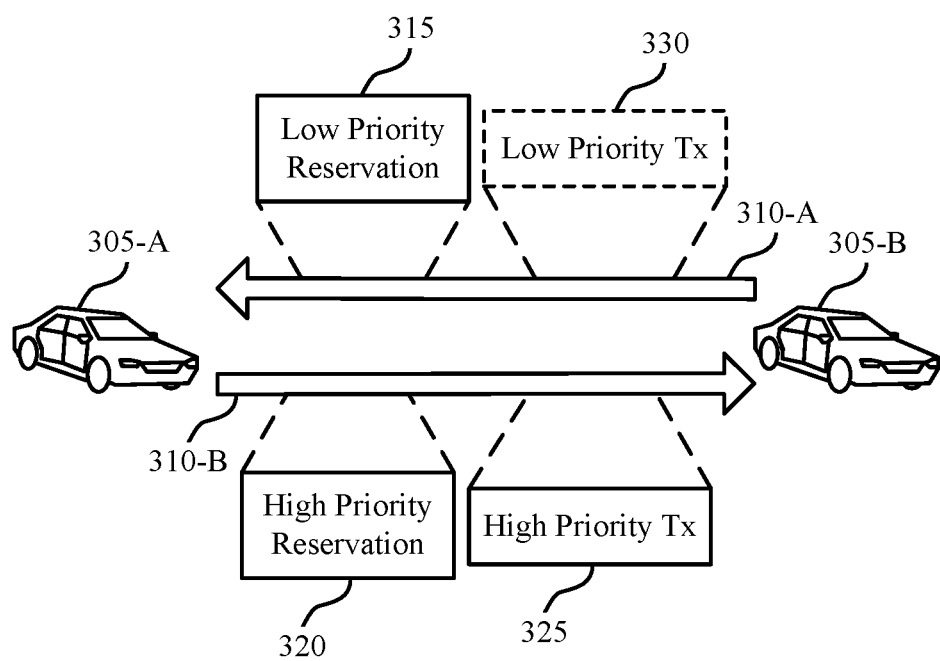

FIG. 3 illustrates an example of a wireless communications system 300 that supports handling packets with different priorities in sidelink systems in accordance with aspects of the present disclosure. The wireless communications system 300 may be an example of a V2X system including vehicles 305-*a* and 305-*b*. These vehicles 305 may be examples of wireless devices or UEs 115 as described with reference to FIGS. 1 and 2. The vehicles 305 may operate within a system without centralized scheduling of resources by a base station 105. Instead, the vehicles 305 may dynamically select resources for transmission. To support transmissions of data packets with different priority levels, the vehicles 305 may implement one or more techniques to allow for fast and reliable transmission of high priority packets in the wireless communications system 300.

A first vehicle 305-*a* and a second vehicle 305-*b* may communicate in the V2X communication system (e.g., wireless communications system 300). Vehicles 305 may use the techniques described herein to improve resource utilization and increase scheduling flexibility. Vehicles 305 may communicate in the V2X communication system by transmitting data packets in transmissions 310 and receiving data packets from other devices (e.g., other vehicles 305, base stations 105, network devices, etc.). For example, vehicle 305-*b* may transmit data packets in transmission 310-*a*, and vehicle 305-*a* may receive data packets from vehicle 305-*b* by receiving transmission 310-*a*. In some cases, vehicles 305 may not be configured to support full-duplex communications, where the vehicles 305 may not transmit and receive data packets during a same TTI. For example, a vehicle 305 may not receive data packets in a first TTI while also transmitting data packets during the same TTI (e.g., transmitting in a TTI that partially or fully overlaps with the first TTI).

To avoid overlapping the transmission and reception of data packets, vehicles 305 may select (e.g., reserve) different TTIs for the transmission of data packets than the TTIs reserved by other nearby vehicles 305. For example, if vehicle 305-*a* identifies a high-priority data packet 325 for transmission, the vehicle 305-*a* may first attempt to schedule the transmission 310-*b* for resources not overlapping with other transmission reservations in time. However, in some cases, vehicle 305-*a* may not be able to identify resources available for scheduling the transmission 310-*b* (e.g., due to previously scheduled transmissions, timing constraints on the transmission 310-*b*, etc.). In these cases, the vehicle 305-*a* transmitting the high-priority data packet 325 may implement methods for preempting the transmission of one or more lower priority data packets 330 (e.g., a lower priority data packet 330 scheduled for transmission by vehicle 305-*b*). The preemption by vehicle 305-*a* of lower priority data packets 330 may involve vehicle 305-*a* reserving resources for the high-priority data packet 325 transmission that overlap with resources for the lower priority data packet 330 transmission. Vehicle 305-*b* may refrain from transmitting the lower priority data packet 330 based on the preemption by the high priority reservation 320.

In order to schedule transmission of the high-priority data packet 325, vehicle 305-*a* may follow a series of steps to determine resources of the time and frequency spectrum in which to schedule the transmission and/or re-transmission of the data packet. The following series of steps describe an exemplary procedure for scheduling data packet transmissions in a V2X communication system. It is to be understood that alternative or additional steps may be included, and the vehicles 305 may implement a different order of steps for selecting resources for transmission scheduling or may perform one or more steps in parallel.

In the exemplary procedure, the first step may involve vehicle 305-*a* identifying candidate TTIs (e.g., slots, sub-slots, symbols, etc.) that are available to utilize for a transmission. This identification of resource candidates may be based on latency capabilities of the vehicle 305-*a* transmissions or reservations detected by the vehicle 305-*a* control exclusion, or some combination of these. For example, vehicle 305-*a* may detect a number of resource reservations transmitted by other devices (e.g., vehicles 305 or other types of UEs 115, base stations 105, etc.). Vehicle 305-*a* may remove resources from the candidate resources based on these identified reservations. Control exclusion may involve vehicle 305-*a* excluding certain resources that are used by devices below a certain distance away from vehicle 305-*a* (e.g., within a pre-determined or dynamic radius around vehicle 305-*a*). Being beyond this threshold distance may signify that a reservation schedules a transmission containing low priority information for the vehicle 305-*a* or is likely to cause minimal (e.g., not significant) interference if vehicle 305-*a* uses the same resources for a transmission of a data packet. As such, the resources reserved for transmissions greater than this distance away may still be included in the identified set of candidate resources due to control exclusion.

In the second step, vehicle 305-*a* may select a TTI (e.g., slot, sub-slot, symbol, etc.) from the identified candidate TTIs for transmission of the data packet. In a first example, vehicle 305-*a* may select a TTI randomly from the candidate TTIs. In a second example, vehicle 305-*a* may select a TTI based on which TTIs are earlier in time. The candidate TTIs may be unoccupied in a resource allocation map maintained at the vehicle 305-*a* and, therefore, may not be reserved for other transmissions.

If the vehicle 305-*a* fails to identify available resources for scheduling the transmission in the second step, vehicle 305-*a* may perform a third step. In the third step, the vehicle 305-*a* may select a TTI from the candidate TTIs that includes a reserved re-transmission of a packet. The vehicle 305-*a* may select unoccupied resources that are multiplexed in frequency with the re-transmission from another vehicle 305. Vehicle 305-*a* may utilize this TTI if the re-transmission from the other vehicles 305 is for a data packet that has already been successfully decoded by vehicle 305-*a*.

If the vehicle 305-*a* fails to identify available resources for scheduling the transmission in the third step, vehicle 305-*a* may perform a fourth step. In the fourth step, vehicle 305-*a* may select any unoccupied resources of the necessary size for the packet transmission. For example, these resources may be FDMed with one or more other scheduled transmissions.

If the vehicle 305-*a* fails to identify available resources for scheduling the transmission in the fourth step, vehicle 305-*a* may perform a fifth step. In the fifth step, vehicle 305-*a* may preempt or usurp resources reserved by a different vehicle 305 for a lower priority data packet 330. This resource preemption procedure is described in more detail below. If vehicle 305-*a* is not able to find available resources in any of the above five steps, vehicle 305-*a* may repeat the examination of availability in the five steps with a different distance threshold for control exclusion (e.g., vehicle 305-*a* may reduce the distance for control exclusion to increase the number of resource candidates). In some cases, vehicle 305-*a* may relax a signal strength threshold (e.g., a sidelink RSRP threshold) for detecting reservations. Vehicle 305-*a* may additionally or alternatively repeat the examination of availability in the five steps with a different time window that may vary from the initial time window by a number of TTIs (e.g., vehicle 305-*a* may extend the selection window by a number of TTIs to increase the number of resource candidates). In some cases, if none of the steps result in vehicle 305-*a* identifying available resources for the transmission, vehicle 305-*a* may drop the transmission of the packet.

To manage the process of preempting resources reserved for transmissions of lower priority data packets 330, vehicle 305-*a* may implement one or more techniques.

A first technique may involve vehicle 305-*a* reserving resources for re-transmissions or later segments of high priority data packets 325 by preempting the scheduled transmission of lower priority data packets 330 by another device (e.g., vehicle 305-*b*). Vehicle 305-*a* may identify a low priority reservation 315 for transmission of a lower priority data packet 330 and may preempt this low priority reservation 315 (e.g., if no other resources are available for reservation according to the series of steps used by vehicle 305-*a* to determine which resources to reserve for the high priority transmission). Vehicle 305-*b* may have reserved a first TTI for the lower priority data packet 330 transmission. Vehicle 305-*a* may schedule the higher priority transmission using high priority reservation 320 during this same first TTI previously reserved by the low priority reservation 315 for transmission of the low priority data packet 330. Vehicle 305-*b* may yield the resources previously reserved for this lower priority transmission based on receiving the high priority reservation 320 from vehicle 305-*a*. In some cases, vehicle 305-*a* may identify multiple low priority reservations 315 by different devices. Vehicle 305-*a* may determine which low priority reservation 315 to preempt based on which low priority reservation 315 has the lower RSSI, RSRP, or other measurement indicating distance away from vehicle 305-*a*.

A second technique may involve vehicle 305-*a* reserving resources for initial transmissions of high priority data packets 325 using a NACK region of a communication spectrum. Vehicle 305-*a* may transmit a high priority reservation 320 in the NACK region to schedule an initial high priority transmission for a TTI sometime after the NACK region (e.g., within a specific pre-determined or dynamic time window). Other devices (e.g., vehicles 305) that have reserved resources for lower priority data packet 330 transmissions in the TTI (or within the time window) following the NACK region may be configured to not transmit a NACK during the NACK region. Refraining from transmitting the NACK may allow the devices to monitor the NACK region for a preempting reservation. These devices may receive the high priority reservation 320 from vehicle 305-*a* in the NACK region and may yield the resources for the high priority data packet 325.

The first and second techniques may be implemented separately or together to manage preempting lower priority resources for high priority initial transmissions, re-transmissions, or both in V2X systems.

Figure 4A:
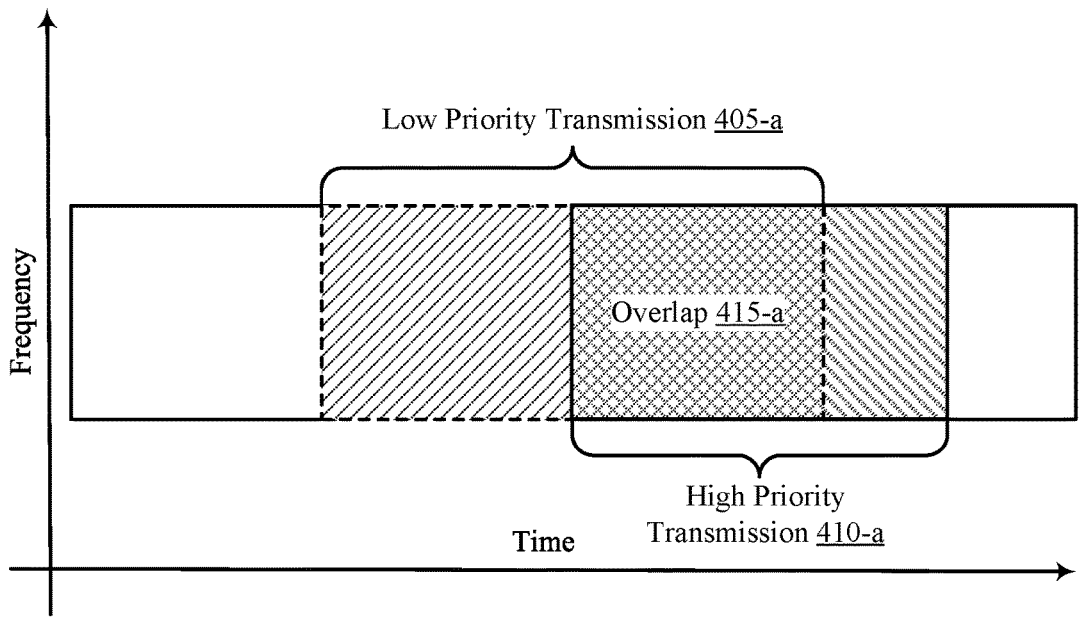
FIGS. 4A and 4B illustrate examples of resource allocations that support handling packets with different priorities in sidelink systems in accordance with aspects of the present disclosure.
Figure 4B:
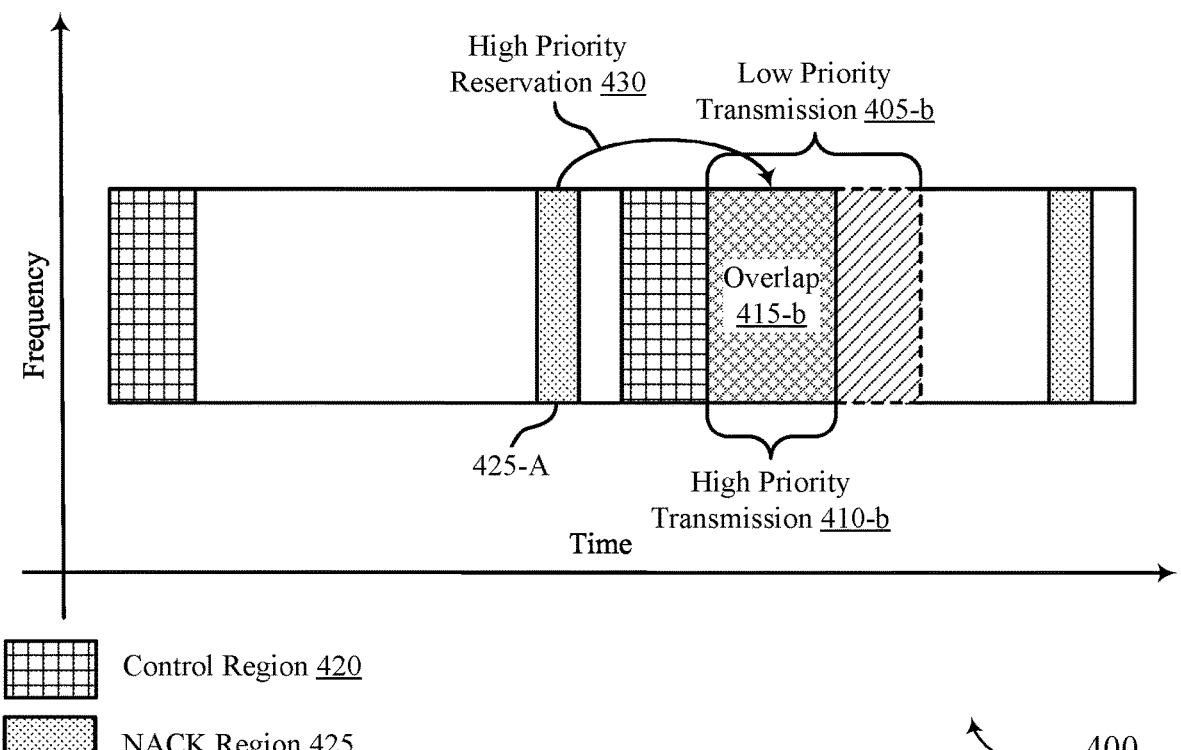

FIGS. 4A and 4B illustrate examples of resource allocations 400 that support handling packets with different priorities in sidelink systems in accordance with aspects of the present disclosure. The resource allocations 400 illustrate examples of resource preemption in V2X systems, such as the wireless communications systems described with reference to FIGS. 1 through 3. In order to support preemption of lower priority packets, vehicles in a V2X system may utilize one or more different techniques. These techniques may be utilized in cases where slot aggregation is supported and in cases where slot aggregation is not supported. In slot aggregation, data packets may be encoded across multiple slots. In some cases, one or more of the techniques may support a maximum frequency allocation for a transmission (e.g., 10 MHz).

FIG. 4A illustrates an example of resource allocation 400-a using a first technique. The first technique may include a vehicle (e.g., a vehicle 305 or UE 115 described with reference to FIGS. 1 through 3) reserving resources for a re-transmission of a data packet or reserving resources for a later segment of a data packet. This data packet may be an example of a higher priority data packet relative to one or more other scheduled data packet transmissions. The transmission of this higher priority data packet (e.g., high priority transmission 410-a) may preempt the scheduled transmission of one or more lower priority data packets (e.g., in low priority transmission 405-a). In some cases, initial transmission procedures may be the same for all data packets regardless of their priority level or packet type. However, re-transmissions of data packets may be scheduled using this first preemption technique. Resources may be reserved for re-transmissions of data packets using control signaling or information contained in a previous transmission of the data packet (e.g., the initial transmission or a previous re-transmission).

A vehicle (e.g., a wireless device, such as a UE 115, in a V2X communications system) may identify a reservation for a low priority transmission 405-a reserved by a second device (e.g., a second vehicle). The vehicle may preempt this reservation for a re-transmission of a high priority transmission 410-a, for example, if no other resources are available for scheduling the re-transmission. As described herein, the low priority transmission 405-a and high priority transmission 410-a may be described relative to one another (e.g., the high priority transmission 410-a is for a data packet with a relatively higher priority than the data packet scheduled to be sent in the low priority transmission 405-a). The priority level for a data packet may be explicitly or implicitly indicated. For example, wireless devices may determine priorities for different data packets based on priority indicator values, packet parameters, packet types, channel conditions, or some combination of these or other relevant packet criteria. In some cases, high priority data packets may include time-sensitive or emergency data while low priority data packets may include non-time-sensitive data (e.g., standard traffic conditions, weather information, etc.).

The preemption by a first vehicle of low priority transmission 405-a by a second vehicle may involve the second vehicle refraining from transmitting the low priority transmission 405-a. Instead, the first vehicle may transmit the high priority transmission 410-a in some or all of the TTI previously reserved for low priority transmission 405-a. For example, low priority transmission 405-a may be scheduled to occur during a first TTI (e.g., based on a reservation transmitted by the second vehicle). The first vehicle may preempt this lower priority reservation by transmitting a reservation for a second TTI that at least partially overlaps with the first TTI. Overlap 415-a illustrates the time period in which both the low priority transmission 405-a and the high priority transmission 410-a are scheduled to be transmitted. The vehicles in the system may update their candidate resource sets, resource allocation maps, or both based on the reservations. For example, the second vehicle may first reserve the first TTI for the low priority transmission 405-a. The first vehicle may receive this reservation, and both vehicles may update vehicle-specific resource allocation maps to indicate this resource reservation for the low priority transmission 405-a. Then, the first vehicle may reserve the second TTI overlapping with the first TTI for the high priority transmission 410-a. The second vehicle may monitor the spectrum and receive the reservation transmitted by the first vehicle. Both vehicles may update their resource allocation maps based on the reservation sent by the first vehicle. For example, the vehicles may identify the overlap 415-a between the reservations and may determine that the reservation by the first vehicle is for a higher priority transmission than the reservation by the second vehicle. As such, the second vehicle may yield and release the resources for low priority transmission 405-a. All vehicles in the system that detect the reservation for the high priority transmission 410-a may remove the reservation for the low priority transmission 405-a from their vehicle-specific resource allocation maps (e.g., a list of candidate resources), and the second vehicle may not utilize these resources for low priority transmission 405-a. Instead, the first vehicle may transmit the high priority transmission 410-a during some or all of the TTI previously reserved for the low priority transmission 405-a, and the other vehicles that received the reservation for the high priority transmission 405-a may monitor for this transmission (e.g., according to their updated resource allocation maps). The second vehicle may reschedule the low priority transmission 405-a for a later TTI. That is, the second vehicle may select (e.g., re-select) a new or updated resource (e.g., in the later TTI) to transmit the low priority transmission 405-a.

In some cases, there may be multiple lower priority reservations that are available for preemption. The first vehicle may determine which low priority transmission(s) 405 to preempt based on a signal strength of a previously transmitted signal (e.g., a reservation, a previous data packet transmission, etc.). The first vehicle may determine which lower priority reservation corresponds to a lower RSSI, RSRP, or other signal strength measurement. For example, the first vehicle may measure a signal strength for the received reservation or for a data packet previously received from the same wireless device. The first vehicle may schedule the high priority transmission 410-a for resources overlapping in time with the low priority transmission 405-a corresponding to the lowest RSSI, RSRP, or other signal strength indicator of the set of possible reservations for preemption. The relatively low RSSI, RSRP, or both may indicate that the reservation and corresponding transmission are occurring far from the first vehicle.

FIG. 4B illustrates an example of resource allocation 400-b using a second technique. In the second technique, a vehicle may indicate a high priority reservation 430 for an initial transmission of a high priority data packet (e.g., high priority transmission 410-b) using a NACK field 425. The NACK field 425 may support multicast transmission of NACK messages by devices in a V2X system. For example, the NACK field 425 may correspond to a pre-defined reception time period prior to the NACK field 425. Any devices (e.g., vehicles or UEs 115) in the system that do not receive a data packet in the reception time period—or that identify a reservation for a data packet but do not receive the corresponding data packet—may transmit a NACK message in the NACK field 425. The NACK message transmissions (e.g., UE-shared NACK feedback) by multiple wireless devices may combine in the NACK field 425, and any device that transmitted a packet in the corresponding time period may monitor the NACK field 425, identify the constructively-combined NACK signal, and determine to re-transmit the packet. The NACK field 425 may correspond to resources (e.g., symbols, RBs, or any combination thereof) which are configured for use by a physical sidelink feedback channel (PSFCH).

To support resource preemption, a vehicle may transmit a high priority reservation 430, which may be an example of a dedicated sequence indicating reservation of resources following the NACK field 425. The high priority reservation 430 may be an example of a pre-reservation and may be sent in time resources (and, in some cases, frequency resources) usually reserved for NACK transmissions. The pre-reservation may reserve resources from a pre-defined preemption time period for a high priority transmission 410-b. In some cases, this second technique may be performed for scheduling data packets of a highest priority level.

The high priority reservation 430 for the high priority transmission 410-b sent in the NACK field 425-a may be referred to as a stop re-transmission (STN) signal. The STN may span a number of sub-channels and the contents of the STN may be configured by or for a vehicle. The high priority reservation 430 may reserve a TTI for high priority transmission 410-b. The TTI for the high priority transmission 410-b may include a region, overlap 415-b, which overlaps with a previously reserved TTI for a low priority transmission 405-b (e.g., previously reserved using control signaling in a prior control region 420 or reserved using information in a previous data packet transmission). Vehicles that have reserved TTIs for low-priority transmissions 405 within a certain preemption time window following the NACK field 425-a may be configured to not transmit a NACK during the NACK field 425-a in order to support reception of the high priority reservation 430 during the NACK field 425-a. For example, a vehicle may have reserved a TTI for low priority transmission 405-b. The vehicle may identify that the scheduled resources for the low priority transmission 405-b at least partially fall within a pre-configured or dynamic time period after the NACK field 425-a in which a high priority transmission 410 may be scheduled using the NACK field 425-a. The vehicle may be configured to not transmit a NACK or other transmission during the NACK field 425-a, effectively preventing the negative effects of half-duplexing within the NACK field 425-a. If the vehicle did not receive a transmission in a previous time period corresponding to the NACK field 425, the vehicle may simply drop the transmission of the NACK message determined for this time period. In some cases, other vehicles not scheduled for transmission in the time period following the NACK field 425-a may still transmit NACK messages in this NACK field 425-a, such that the first vehicle dropping the NACK transmission may have little to no effect on a multicast HARQ procedure.

A second vehicle may send the high priority reservation 430 reserving a TTI for high priority transmission 410-b during the NACK field 425-a, and the first vehicle may receive the high-priority reservation 430 (e.g., based on not transmitting a NACK in the NACK field 425-a). The first vehicle may determine that the high-priority reservation 430 preempts the scheduled low priority transmission 405-b if the high priority reservation 430 reserves at least part of the TTI reserved for low priority transmission 405-b. In these cases, the first vehicle may release the TTI reserved for low priority transmission 405-b to the second vehicle, and the second vehicle may transmit the high priority transmission 410-b in a part or all of the TTI. In some cases, the resources reserved by a high priority reservation 430 sent in a NACK field 425 may be pre-configured rather than dynamically indicated in the high priority reservation 430.

The second vehicle may transmit the pre-reservation sequence in the NACK field 425-a to reserve future resources for a transmission in cases where a preemption will occur (e.g., where the resources overlap with resources previously reserved for one or more low priority transmissions 405) and in cases where a preemption will not occur. A preemption may not occur if the pre-reservation is reserving resources that are not already reserved by another vehicle or device for a different data packet transmission. In these cases, rather than using the second technique as a preemption technique, a vehicle may use this second technique (e.g., transmitting a high priority reservation 430 in a NACK field 425) to quickly reserve open resources for high priority transmissions 410.

While FIGS. 4A and 4B illustrate the low priority transmissions 405 and high priority transmissions 410 spanning the same frequency regions (e.g., RBs, sub-carriers, etc.), it is to be understood that the transmissions may alternatively span different frequency regions, bandwidths, etc.

Figure 5:
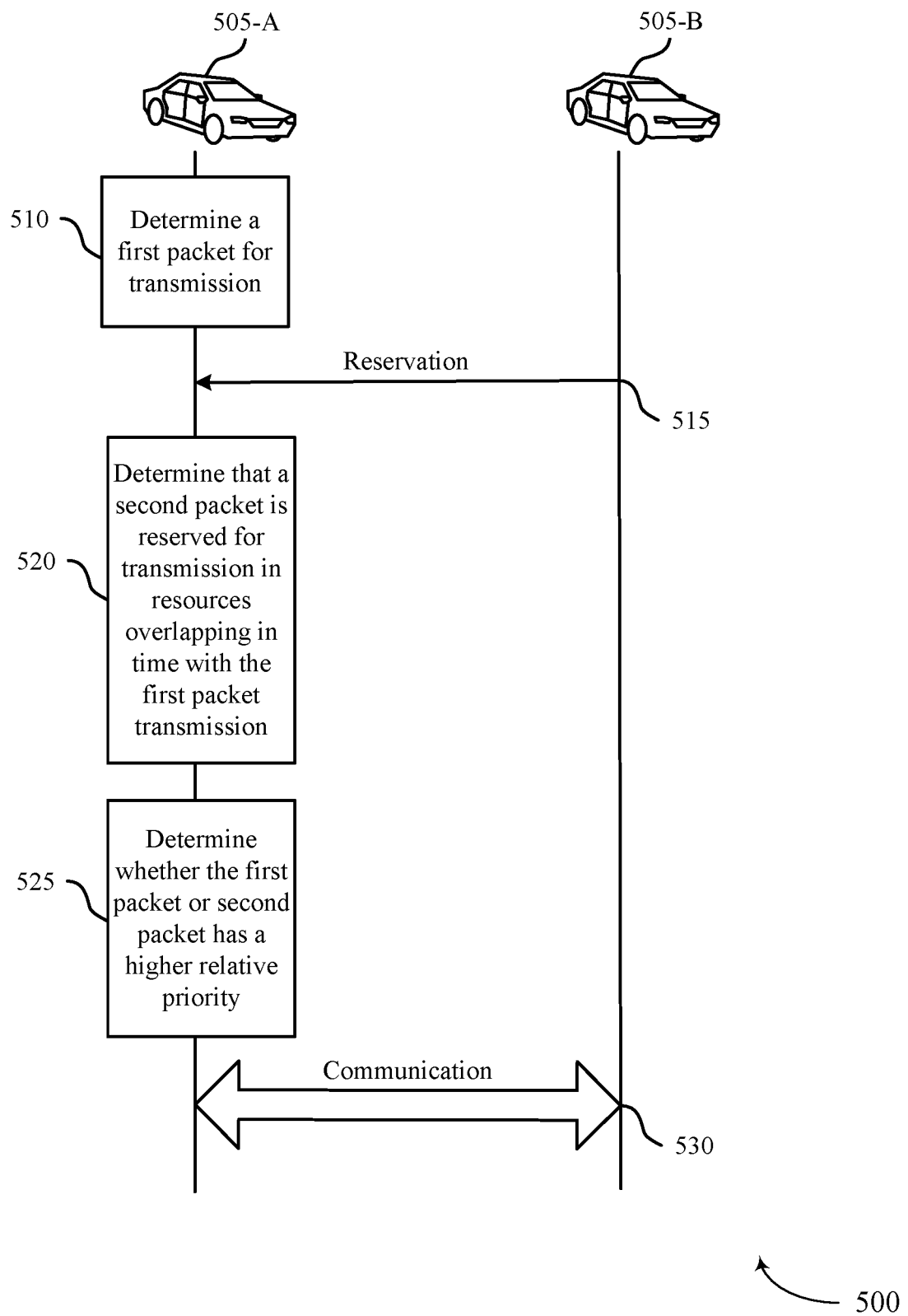
FIG. 5 illustrates an example of a process flow that supports handling packets with different priorities in sidelink systems in accordance with aspects of the present disclosure.

FIG. 5 illustrates an example of a process flow 500 that supports handling packets with different priorities in sidelink systems in accordance with aspects of the present disclosure. Process flow 500 may include vehicle 505-a and vehicle 505-b. Vehicles 505-a and 505-b may be examples of wireless devices, such as UEs 115 or vehicles 305 as described herein with reference to FIGS. 1 through 4. Vehicles 505-a and 505-b may support resource preemption to efficiently handle packets with different priority levels. Alternative examples of the following may be implemented, where steps may be performed in a different order than described or are not performed at all. In some cases, steps may include additional features not mentioned below, or further steps may be added.

At 510, vehicle 505-a may determine a first packet for transmission during a first TTI within a V2X system (e.g., a sidelink system). In some cases, the first packet (e.g., a first data packet) may be an initial transmission, and in other cases, the first packet may be a re-transmission of a previously transmitted packet. Vehicle 505-b may schedule a transmission of a second packet by selecting resources to transmit the second packet. The scheduled transmissions may occur at least partially during a same TTI, which may be an example of a symbol, sub-slot, slot, or set of slots. The first packet, the second packet, or both packets may be encoded across a set of slots depending on whether slot aggregation is implemented. A maximum limit on the number of re-transmissions for a packet may be modified based on the priority of the packet. For example, if the first packet is very high priority, the maximum number of re-transmissions for the first packet may be increased to increase the likelihood of nearby devices receiving the first packet and decoding it.

At 515, vehicle 505-a may receive a reservation from vehicle 505-b. The reservation may include an indication of a TTI that is reserved via a first reservation for a second data packet for transmission by vehicle 505-b. This indication may be included in the resource allocation map of vehicle 505-b (e.g., based on vehicle 505-b transmitting the reservation for these resources). Vehicle 505-a may update its resource allocation map (e.g., corresponding to a set of candidate resources constructed from the resource allocation map, configured parameters, or both) based on the indication received from vehicle 505-b. For example, vehicle 505-a may exclude the one or more resources of the TTI reserved for the second packet from the set of candidate resources.

At 520, vehicle 505-a may determine that the second packet from vehicle 505-b is reserved for transmission during at least a portion of the first TTI that is reserved for the first packet by vehicle 505-*a*. This identification may be based on the indication received in the first reservation at 515.

In some cases, vehicle 505-*a* may schedule transmission of the first packet based on identifying that a resource reservation (e.g., a resource allocation, such as the resources selected by vehicle 505-*a* and other nearby vehicles 505 and wireless devices in the system) includes one or more reserved transmissions (e.g., previously scheduled transmissions) such that any TTI selected by vehicle 505-*a* for transmission of the first packet will at least partially overlap in time with at least one transmission reserved by a nearby vehicle 505, a wireless device, or both in the system. When vehicle 505-*a* schedules the transmission (e.g., a re-transmission) of the first packet during the first TTI (i.e., when vehicle 505-*a* selects the first TTI to transmit the first packet), the scheduled transmission may at least partially overlap in time with a reserved transmission of the second packet based on vehicle 505-*a* identifying no available resources for multiplexing the first packet in time and determining the relatively low priority of the second packet. Additionally or alternatively, vehicle 505-*a* may schedule the first packet transmission based on a signal strength associated with the second packet transmission. For example, vehicle 505-*a* may determine that an RSRP measurement associated with the reservation received at 515 is less than an RSRP threshold and may preempt the second packet transmission based on this RSRP measurement. Vehicle 505-*a* may also identify that a third packet is reserved for transmission by a third vehicle or wireless device during a different TTI than the first TTI. The first packet may have a higher relative priority than the third packet (e.g., in addition to the second packet). Vehicle 505-*a* may determine that a first signal strength corresponding to the reservation for transmission of the second packet received at 515 may be less than a second signal strength corresponding to a reservation for transmission of the third packet. The transmission of the first packet may be scheduled for the TTI non-overlapping with the TTI reserved for the third packet based on determining that the first signal strength is less than the second signal strength.

In other cases, vehicle 505-*a* may communicate in resources reserved for NACK messaging. The reservation for the TTI may include a dedicated sequence. The communicating in a NACK field may include a reservation for the TTI, where vehicle 505-*a* either transmits a reservation for the first packet or receives a reservation for the second packet from vehicle 505-*b* in the NACK field. In these cases, the packet may be an example of an initial transmission of a packet. In some cases, a packet transmission reserved using the resources usually reserved for NACK messaging may be scheduled within a pre-determined preemption time period. If vehicle 505-*a* schedules the transmission of the first packet at least partially within the pre-determined time period, vehicle 505-*a* may refrain from transmitting a NACK message in the resources reserved for NACK messaging based on the scheduling. Vehicle 505-*a* may instead monitor the resources reserved for NACK messaging for a reservation for the TTI. Vehicle 505-*a* may not be able to transmit a NACK and monitor for a reservation from vehicle 505-*b* simultaneously, and thus vehicle 505-*a* may refrain from transmitting a NACK in order to monitor the NACK resources to determine if the scheduled first packet transmission is preempted by a higher priority transmission.

At 525, vehicle 505-*a* may determine whether the first packet or the second packet has a higher priority level. At 530, vehicles 505-*a* and 505-*b* may communicate based on the reservations and the respective priorities. In some cases at 525, vehicle 505-*a* may determine that the first packet has a higher priority level than the second packet. In these cases, at 530, the communication during the TTI may include vehicle 505-*a* transmitting the first packet based on the reservation for the TTI. Additionally, vehicle 505-*b* may yield the resources to vehicle 505-*a* and refrain from transmitting the second packet in the TTI. In other cases at 525, vehicle 505-*a* may determine that the second packet has a higher priority level than the first packet. In these cases, at 530, vehicle 505-*a* may receive the second packet during the TTI. Additionally, vehicle 505-*a* may yield the resources to vehicle 505-*b* and refrain from transmitting the second packet in the TTI.

Figure 6:
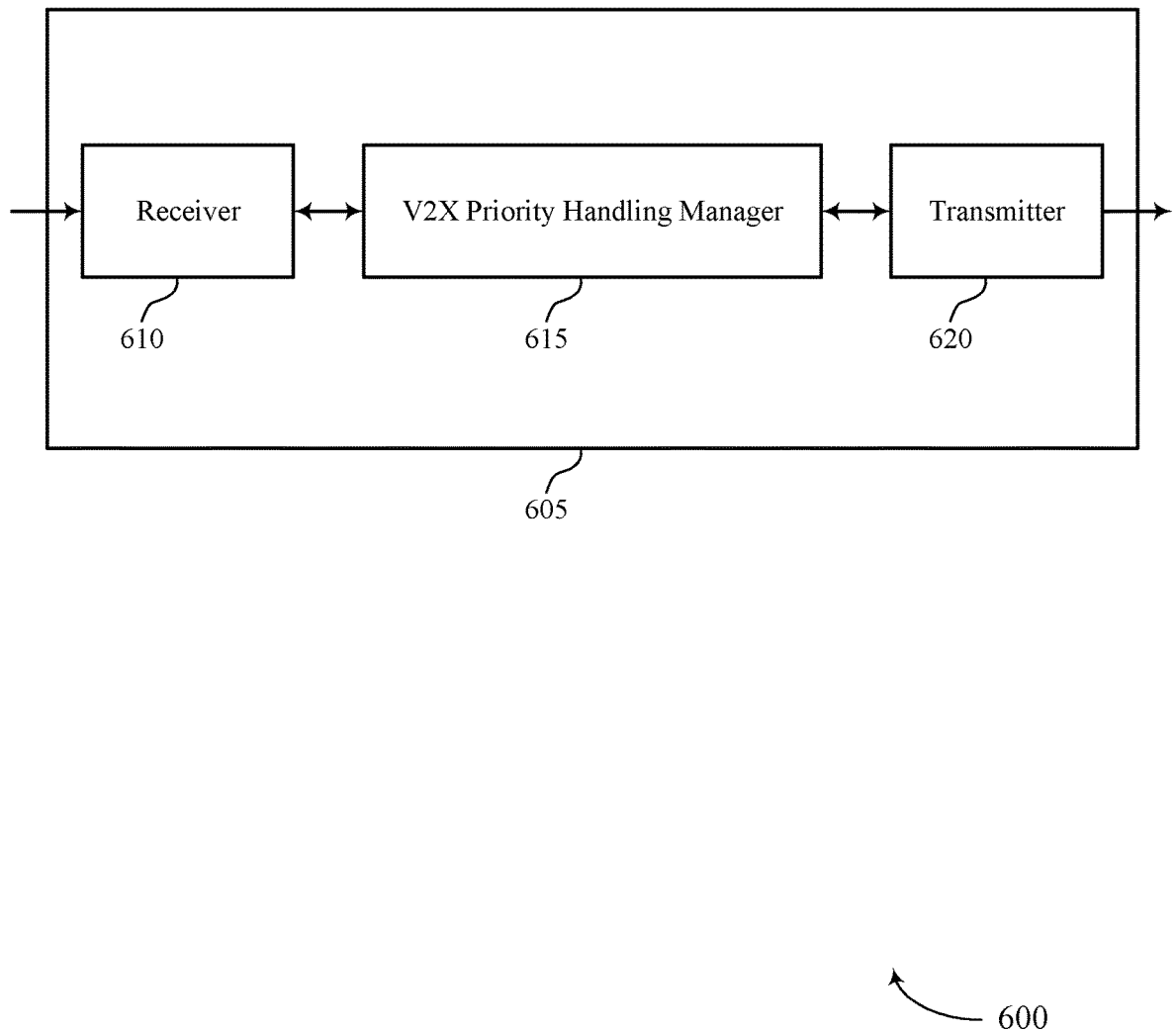
FIGS. 6 and 7 show block diagrams of devices that support handling packets with different priorities in sidelink systems in accordance with aspects of the present disclosure.

FIG. 6 shows a block diagram 600 of a device 605 that supports handling packets with different priorities in sidelink systems in accordance with aspects of the present disclosure. The device 605 may be an example of aspects of a UE 115 as described herein. The device 605 may include a receiver 610, a V2X priority handling manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to handling packets with different priorities in V2X systems, etc.). Information may be passed on to other components of the device 605. The receiver 610 may be an example of aspects of the transceiver 920 described with reference to FIG. 9. The receiver 610 may utilize a single antenna or a set of antennas.

The V2X priority handling manager 615 may be a component of a first wireless device in a sidelink system (e.g., a V2X system). The V2X priority handling manager 615 may identify a first packet for transmission during a TTI within the sidelink system, determine that a second packet is reserved for transmission by a second wireless device during at least a portion of the TTI within the sidelink system, determine whether the first packet or the second packet has a higher relative priority, and communicate in the sidelink system during the TTI by either transmitting the first packet or receiving the second packet based on which of the first packet or the second packet has the higher relative priority. The V2X priority handling manager 615 may be an example of aspects of the V2X priority handling manager 910 described herein.

The actions performed by the V2X priority handling manager 615 as described herein may be implemented to realize one or more potential advantages. For example, supporting preemption of reserved resources based on packet priorities may allow a UE 115 greater flexibility in scheduling high priority packets. This may reduce the latency involved in high priority sidelink communications between UEs 115 (e.g., between vehicles in a V2X communication system). Additionally, this preemption may allow a UE 115 to release resources previously reserved for a low priority transmission, reducing the likelihood of collisions on the sidelink channels and allowing half duplex UEs 115 to successfully monitor for high priority packets.

Based on communicating in the V2X system according to which packets have higher relative priorities, a processor of the first wireless device (e.g., a processor controlling the receiver 610, the V2X priority handling manager 615, the transmitter 620, etc.) may reduce processing resources used for sidelink communications. For example, by refraining from transmitting a first packet if a preempting second packet has a higher relative priority, the UE 115 may mitigate collisions and reduce a number of re-transmissions on the sidelink channel. Reducing the number of re-transmissions may reduce a number of times the processor ramps up processing power and turns on processing units to handle sidelink packet transmissions.

The V2X priority handling manager 615, or its sub-components, may be implemented in hardware, code (e.g., software or firmware) executed by a processor, or any combination thereof. If implemented in code executed by a processor, the functions of the V2X priority handling manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The V2X priority handling manager 615, or its sub-components, may be physically located at various positions, including being distributed such that portions of functions are implemented at different physical locations by one or more physical components. In some examples, the V2X priority handling manager 615, or its sub-components, may be a separate and distinct component in accordance with various aspects of the present disclosure. In some examples, the V2X priority handling manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver manager. For example, the transmitter 620 may be an example of aspects of the transceiver 920 described with reference to FIG. 9. The transmitter 620 may utilize a single antenna or a set of antennas.

Figure 7:
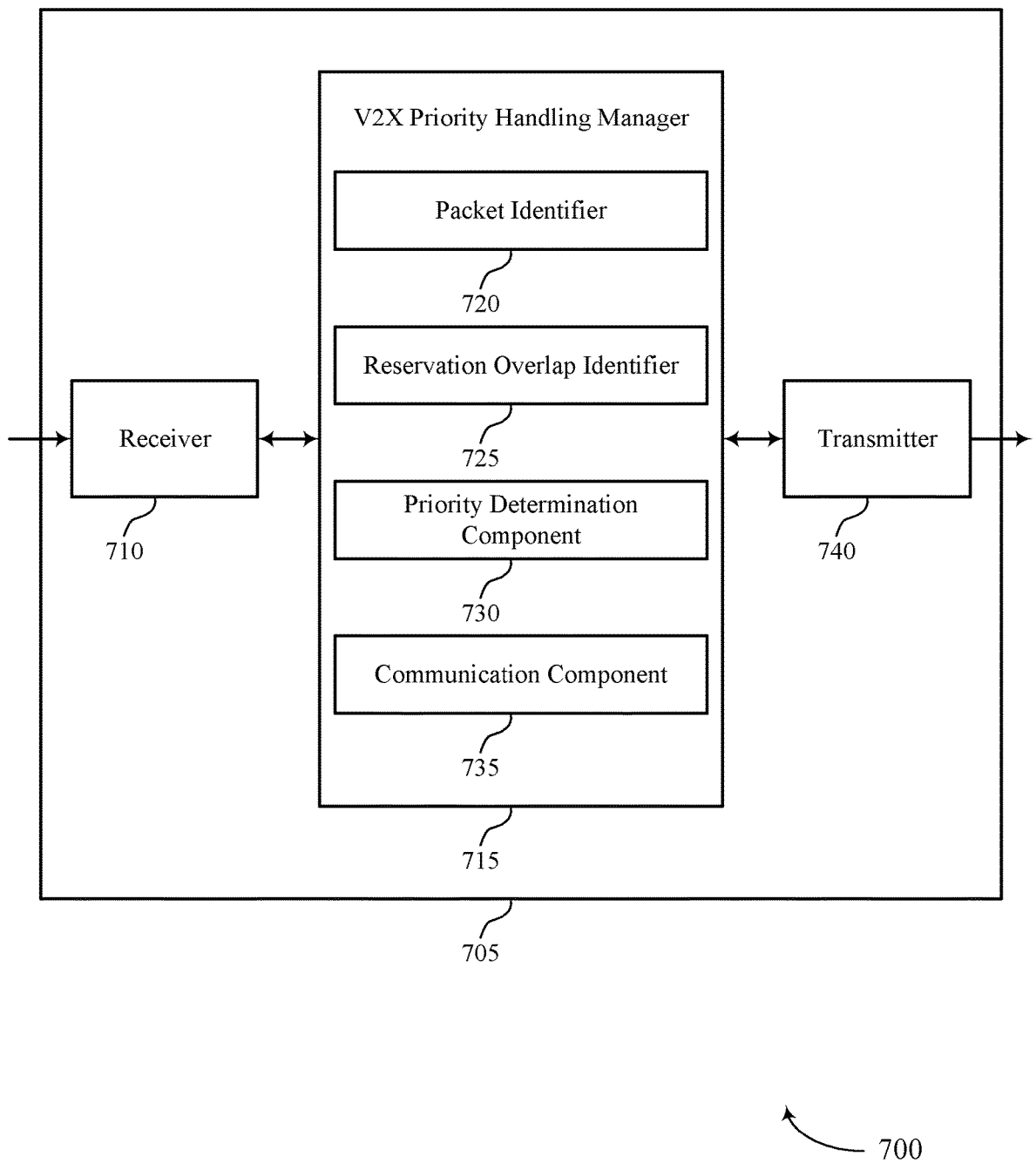

FIG. 7 shows a block diagram 700 of a device 705 that supports handling packets with different priorities in sidelink systems in accordance with aspects of the present disclosure. The device 705 may be an example of aspects of a device 605 or a UE 115 (e.g., a vehicle in a V2X system) as described herein. The device 705 may include a receiver 710, a V2X priority handling manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to handling packets with different priorities in V2X systems, etc.). Information may be passed on to other components of the device 705. The receiver 710 may be an example of aspects of the transceiver 920 described with reference to FIG. 9. The receiver 710 may utilize a single antenna or a set of antennas.

The V2X priority handling manager 715 may be an example of aspects of the V2X priority handling manager 615 as described herein. The V2X priority handling manager 715 may include a packet identifier 720, a reservation overlap identifier 725, a priority determination component 730, and a communication component 735. The V2X priority handling manager 715 may be an example of aspects of the V2X priority handling manager 910 described herein. The V2X priority handling manager 715 may be a component of a first wireless device in a sidelink system (e.g., a V2X system).

The packet identifier 720 may identify a first packet for transmission during a TTI within the sidelink system. The reservation overlap identifier 725 may determine that a second packet is reserved for transmission by a second wireless device during at least a portion of the TTI within the sidelink system. The priority determination component 730 may determine whether the first packet or the second packet has a higher relative priority. The communication component 735 may communicate in the sidelink system during the TTI by either transmitting the first packet or receiving the second packet based on which of the first packet or the second packet has the higher relative priority.

The transmitter 740 may transmit signals generated by other components of the device 705. In some examples, the transmitter 740 may be collocated with a receiver 710 in a transceiver manager. For example, the transmitter 740 may be an example of aspects of the transceiver 920 described with reference to FIG. 9. The transmitter 740 may utilize a single antenna or a set of antennas.

Figure 8:
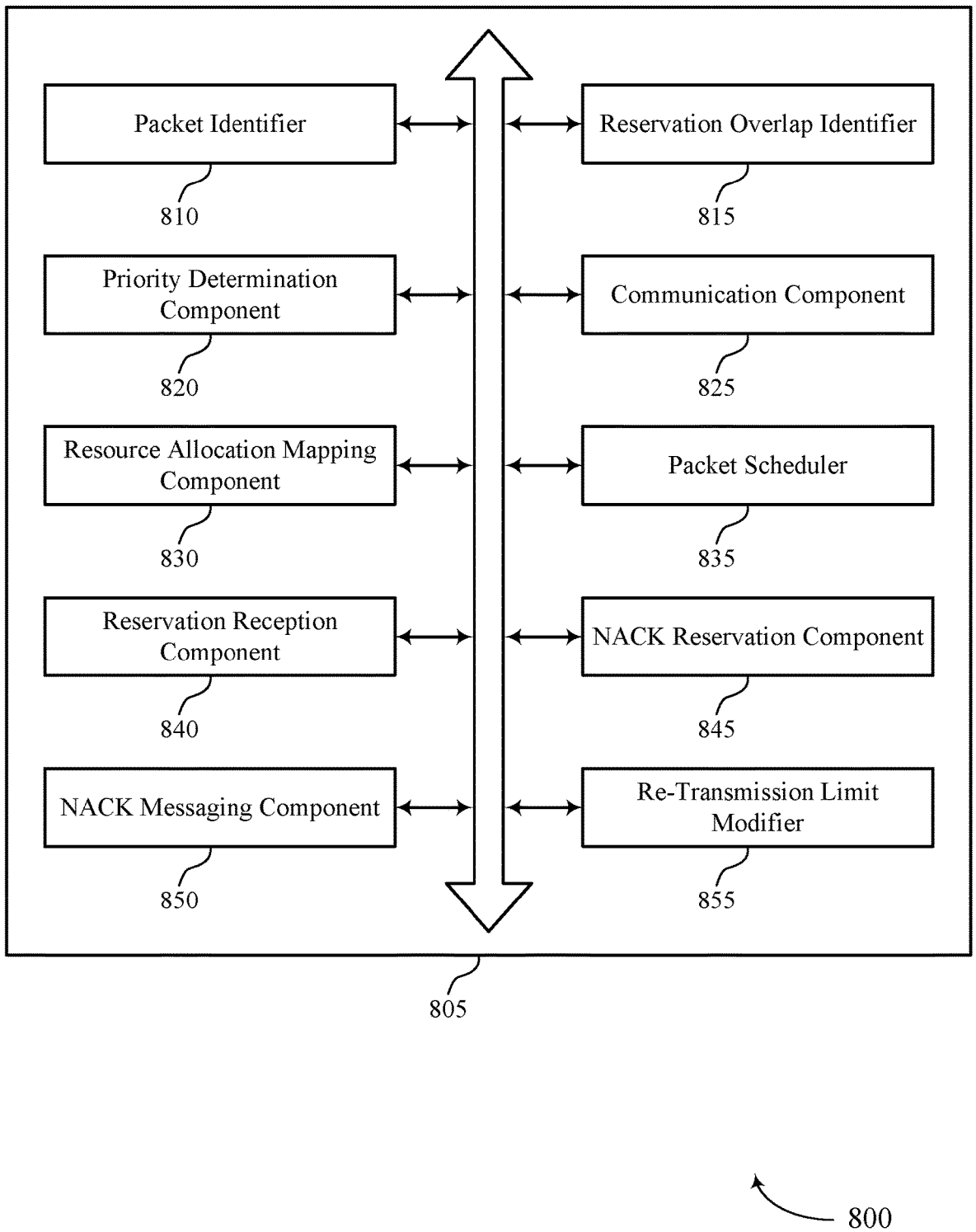
FIG. 8 shows a block diagram of a vehicle-to-everything (V2X) priority handling manager that supports handling packets with different priorities in sidelink systems in accordance with aspects of the present disclosure.

FIG. 8 shows a block diagram 800 of a V2X priority handling manager 805 that supports handling packets with different priorities in sidelink systems in accordance with aspects of the present disclosure. The V2X priority handling manager 805 may be an example of aspects of a V2X priority handling manager 615, a V2X priority handling manager 715, or a V2X priority handling manager 910 described herein. The V2X priority handling manager 805 may include a packet identifier 810, a reservation overlap identifier 815, a priority determination component 820, a communication component 825, a resource allocation mapping component 830, a packet scheduler 835, a reservation reception component 840, a NACK reservation component 845, a NACK messaging component 850, and a re-transmission limit modifier 855. Each of these components may communicate, directly or indirectly, with one another (e.g., via one or more buses).

The packet identifier 810 may identify, by a first wireless device in a sidelink system, a first packet for transmission during a TTI within the sidelink system. The reservation overlap identifier 815 may determine that a second packet is reserved for transmission by a second wireless device during at least a portion of the TTI within the sidelink system. In some cases, the TTI includes a set of slots.

The priority determination component 820 may determine whether the first packet or the second packet has a higher relative priority. The communication component 825 may communicate in the sidelink system during the TTI by either transmitting the first packet or receiving the second packet based on which of the first packet or the second packet has the higher relative priority.

In some cases, the determining whether the first packet or the second packet has the higher relative priority includes determining that the first packet has a higher relative priority than the second packet. In these cases, the communicating includes transmitting the first packet during the TTI. In other cases, the determining whether the first packet or the second packet has the higher relative priority includes determining that the second packet has a higher relative priority than the first packet. In these other cases, the communicating includes receiving the second packet during the TTI and, in some examples, refraining from transmitting the first packet during the TTI.

The resource allocation mapping component 830 may receive an indication that one or more resources of the TTI are reserved via a first reservation for the second packet (e.g., where the indication may be included in a resource allocation map). In some examples, the resource allocation mapping component 830 may update a set of candidate resources to exclude the one or more resources of the TTI based on the second packet having the higher relative priority (and, correspondingly, the first packet having the lower relative priority). The communication component 825 may refrain from transmitting the first packet during the one or more resources of the TTI based on the second packet having the higher relative priority and the packet scheduler 835 may select one or more updated resources of the updated set of candidate resources to transmit the first packet based on the refraining. In some other examples, the resource allocation mapping component 830 may maintain the one or more resources of the TTI in a set of candidate resources based on the first packet having the higher relative priority (and, correspondingly, the second packet having the lower relative priority).

In some cases, the first packet may be a re-transmission of a packet with a higher relative priority than the second packet. In these cases, the packet scheduler 835 may select the TTI to transmit the first packet based on the second packet having a lower relative priority than the first packet.

In some examples the selecting may involve the packet scheduler 835 determining that a resource reservation (e.g., the resources selected by a set of wireless devices) includes one or more reserved transmissions such that any TTI selection for transmission of the first packet overlaps with at least one reserved transmission of the one or more reserved transmissions. The packet scheduler 835 may select the TTI to transmit the first packet such that the selected TTI at least partially overlaps in time with a reserved transmission of the second packet based on the determining that the resource reservation includes the one or more reserved transmissions.

In some examples, the packet scheduler 835 may determine that a third packet is reserved for transmission by a third wireless device during a different TTI than the TTI, where the first packet additionally has a higher relative priority than the third packet. In some examples, the packet scheduler 835 may determine that a first signal strength corresponding to a reservation for transmission of the second packet is less than a second signal strength corresponding to a reservation for transmission of the third packet, where the TTI is further selected such that the selected TTI is non-overlapping with the different TTI based on the determining that the first signal strength is less than the second signal strength.

In some cases, the second packet is a re-transmission of a packet with a higher relative priority than the first packet. In these cases, the packet scheduler 835 may select the TTI to transmit the first packet. The reservation reception component 840 may receive control information including a reservation for transmission of the second packet during at least the portion of the selected TTI. The communication component 825 may refrain from transmitting the first packet during the selected TTI based on the reservation for transmission of the second packet and the determining whether the first packet or the second packet has the higher relative priority (e.g., determining that the second packet has a higher relative priority than the first packet).

The NACK reservation component 845 may communicate, in resources reserved for NACK messaging, a reservation for the TTI by either transmitting a reservation for the first packet or receiving a reservation for the second packet, where either determining the first packet for transmission during the TTI or determining that the second packet is reserved for transmission during at least the portion of the TTI is based on the reservation. For example, if the NACK reservation component 845 receives the reservation for the second packet in the resources reserved for NACK messaging, the communication component 825 may determine that the second packet is reserved for transmission during at least the portion of the TTI based on the received reservation. Alternatively, if the NACK reservation component 845 transmits the reservation for the first packet in the resources reserved for NACK messaging, the communication component 825 may determine the first packet for transmission during the TTI based on the transmitted reservation. In some cases, the reservation for the TTI includes a dedicated sequence.

In some cases, the first packet is an initial transmission of a packet with a higher relative priority than the second packet. In these cases, the communicating the reservation for the TTI involves the NACK reservation component 845 transmitting the reservation for the first packet in the resources reserved for NACK messaging. In these cases, the communicating during the TTI involves the communication component 825 transmitting the first packet based on the reservation for the TTI.

In other cases, the second packet is an initial transmission of a packet with a higher relative priority than the first packet. In these cases, the communicating the reservation for the TTI involves the NACK reservation component 845 receiving the reservation for the second packet in the resources reserved for NACK messaging. The communication component 825 may refrain from transmitting the first packet during the TTI based on the reservation for the TTI and may receive the second packet based on the reservation for the TTI.

In some cases, the second packet is received within a pre-determined preemption time period. The packet scheduler 835 may select the TTI to transmit the first packet such that the selected TTI is at least partially within the pre-determined preemption time period. The NACK messaging component 850 may refrain from transmitting a NACK message in the resources reserved for NACK messaging based on the selected TTI and may monitor the resources reserved for NACK messaging for the reservation for the TTI based on the refraining from transmitting the NACK message.

The re-transmission limit modifier 855 may modify a maximum re-transmission limit for a packet in the sidelink system based on a relative priority of the packet.

Figure 9:
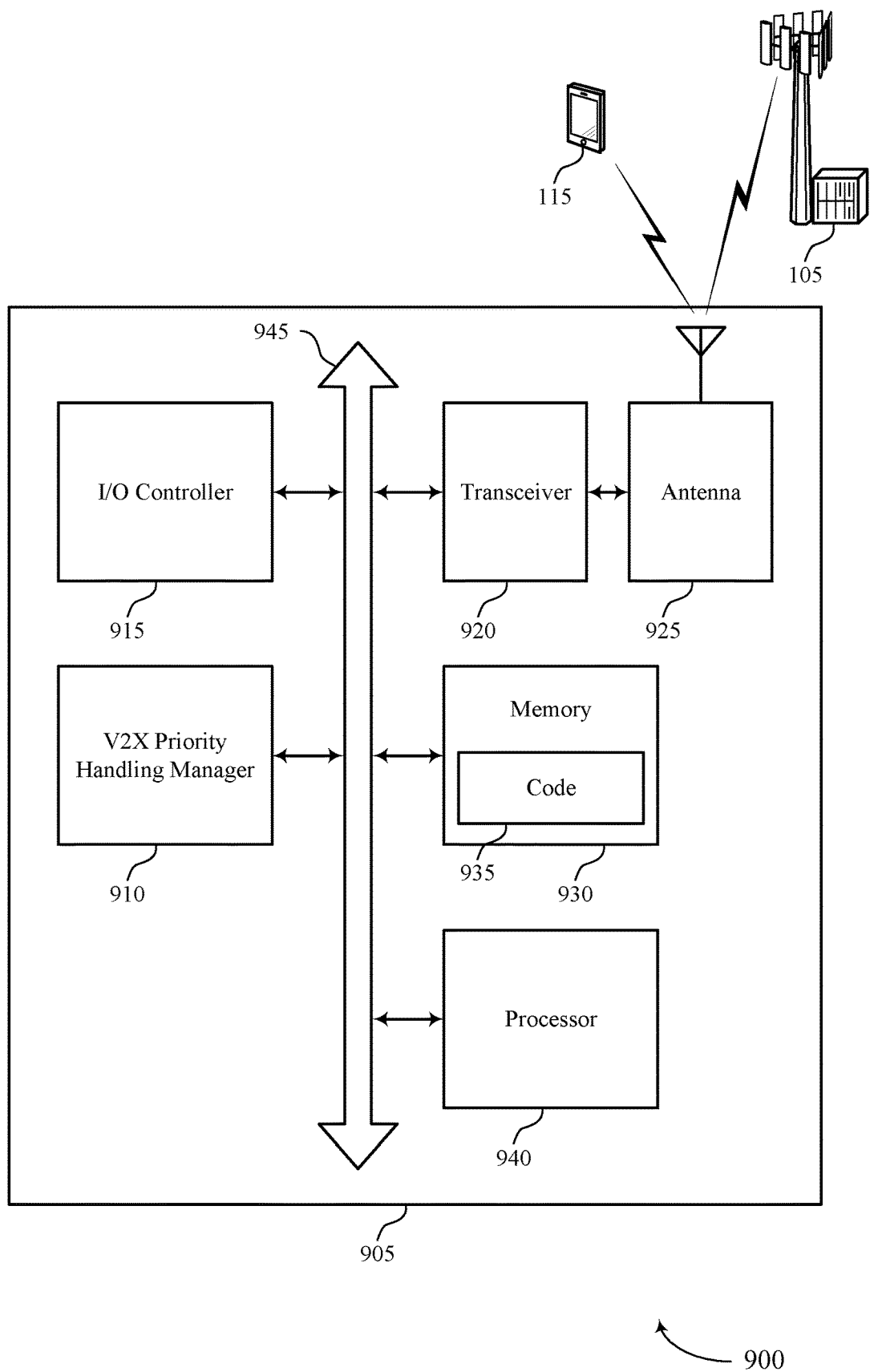
FIG. 9 shows a diagram of a system including a device that supports handling packets with different priorities in sidelink systems in accordance with aspects of the present disclosure.

FIG. 9 shows a diagram of a system 900 including a device 905 that supports handling packets with different priorities in sidelink systems in accordance with aspects of the present disclosure. The device 905 may be an example of or include the components of device 605, device 705, or a UE 115 (e.g., a vehicle in a V2X system) as described herein. The device 905 may include components for bi-directional voice and data communications including components for transmitting and receiving communications, including a V2X priority handling manager 910, an I/O controller 915, a transceiver 920, an antenna 925, memory 930, and a processor 940. These components may be in electronic communication via one or more buses (e.g., bus 945).

The V2X priority handling manager 910 may identify, by a first wireless device in a sidelink system, a first packet for transmission during a TTI within the sidelink system, determine that a second packet is reserved for transmission by a second wireless device during at least a portion of the TTI within the sidelink system, determine whether the first packet or the second packet has a higher relative priority, and communicate in the sidelink system during the TTI by either transmitting the first packet or receiving the second packet based on which of the first packet or the second packet has the higher relative priority.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting handling packets with different priorities in sidelink systems).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
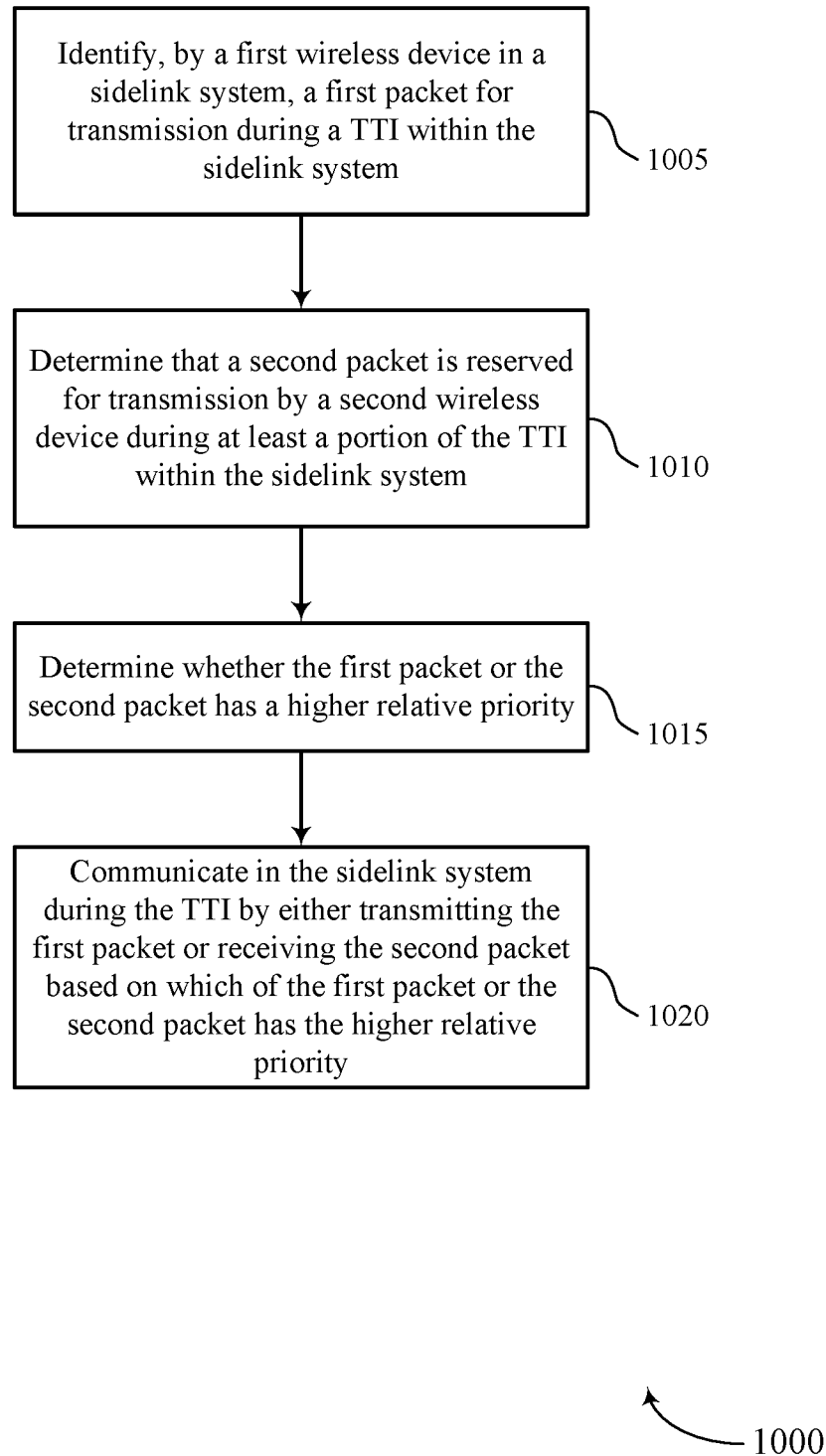
FIGS. 10 through 13 show flowcharts illustrating methods that support handling packets with different priorities in sidelink systems in accordance with aspects of the present disclosure.

FIG. 10 shows a flowchart illustrating a method 1000 that supports handling packets with different priorities in sidelink systems in accordance with aspects of the present disclosure. The operations of method 1000 may be implemented by a first wireless device (e.g., a UE 115, such as a vehicle in a V2X system) or its components as described herein. For example, the operations of method 1000 may be performed by a V2X priority handling manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE (e.g., a first wireless device in a sidelink system) may identify a first packet for transmission during a TTI within the sidelink system. The operations of 1005 may be performed according to the methods described herein. In some examples, aspects of the operations of 1005 may be performed by a packet identifier as described with reference to FIGS. 6 through 9.

At 1010, the UE may determine that a second packet is reserved for transmission by a second wireless device during at least a portion of the TTI within the sidelink system. The operations of 1010 may be performed according to the methods described herein. In some examples, aspects of the operations of 1010 may be performed by a reservation overlap identifier as described with reference to FIGS. 6 through 9.

At 1015, the UE may determine whether the first packet or the second packet has a higher relative priority. The operations of 1015 may be performed according to the methods described herein. In some examples, aspects of the operations of 1015 may be performed by a priority determination component as described with reference to FIGS. 6 through 9.

At 1020, the UE may communicate in the sidelink system during the TTI by either transmitting the first packet or receiving the second packet based on which of the first packet or the second packet has the higher relative priority. The operations of 1020 may be performed according to the methods described herein. In some examples, aspects of the operations of 1020 may be performed by a communication component as described with reference to FIGS. 6 through 9.

Figure 11:
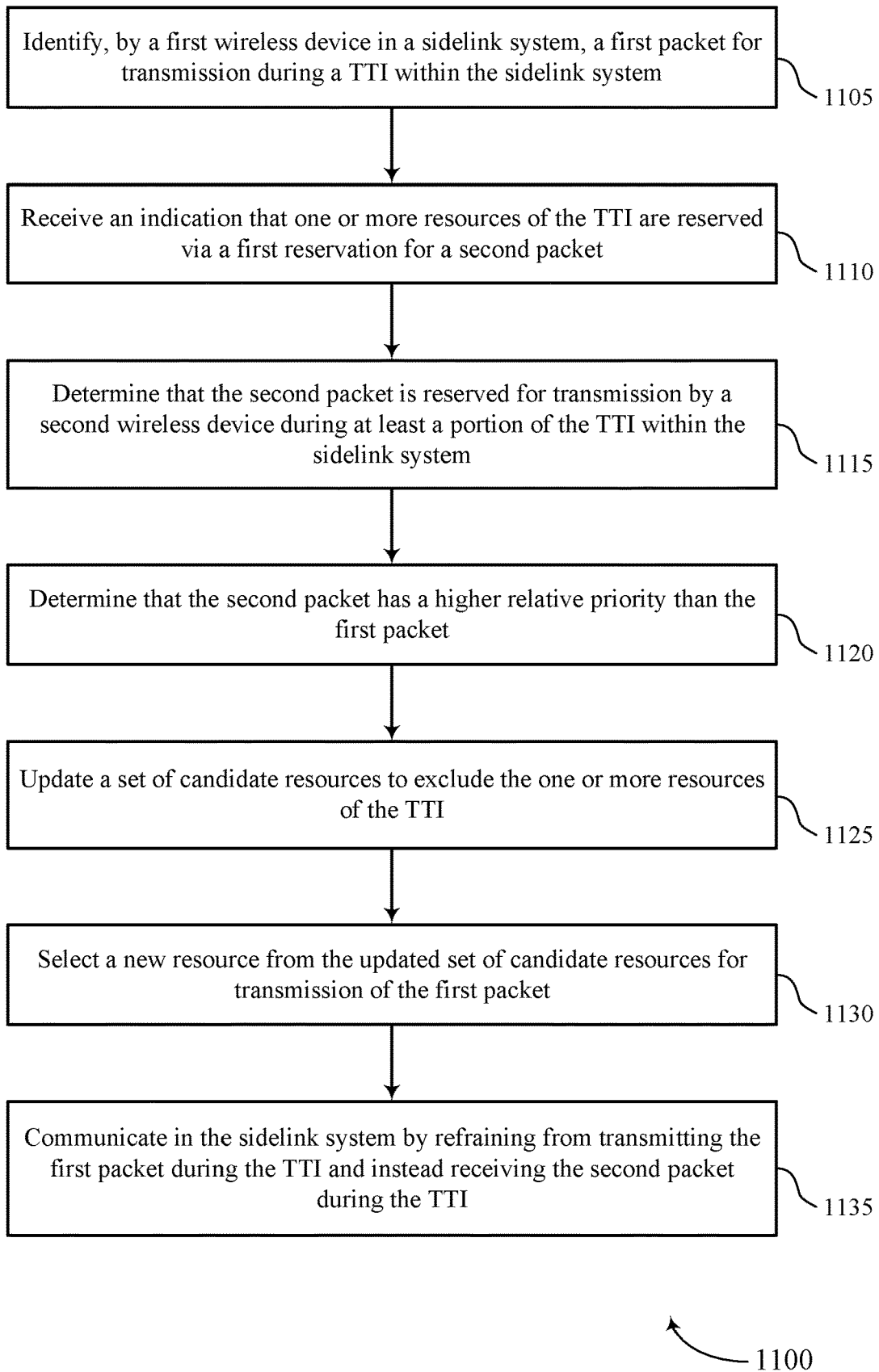

FIG. 11 shows a flowchart illustrating a method 1100 that supports handling packets with different priorities in sidelink systems in accordance with aspects of the present disclosure. The operations of method 1100 may be implemented by a first wireless device (e.g., a UE 115, such as a vehicle in a V2X system) or its components as described herein. For example, the operations of method 1100 may be performed by a V2X priority handling manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE (e.g., a first wireless device in a sidelink system) may identify a first packet for transmission during a TTI within the sidelink system. The operations of 1105 may be performed according to the methods described herein. In some examples, aspects of the operations of 1105 may be performed by a packet identifier as described with reference to FIGS. 6 through 9.

At 1110, the UE may receive an indication that one or more resources of the TTI are reserved via a first reservation for a second packet. The operations of 1110 may be performed according to the methods described herein. In some examples, aspects of the operations of 1110 may be performed by a resource allocation mapping component as described with reference to FIGS. 6 through 9.

At 1115, the UE may determine that the second packet is reserved for transmission by a second wireless device during at least a portion of the TTI within the sidelink system. The operations of 1115 may be performed according to the methods described herein. In some examples, aspects of the operations of 1115 may be performed by a reservation overlap identifier as described with reference to FIGS. 6 through 9.

At 1120, the UE may determine whether the first packet or the second packet has a higher relative priority. For example, the UE may determine that the second packet has a higher relative priority than the first packet. The operations of 1120 may be performed according to the methods described herein. In some examples, aspects of the operations of 1120 may be performed by a priority determination component as described with reference to FIGS. 6 through 9.

At 1125, the UE may update a set of candidate resources to exclude the one or more resources of the TTI based on the second packet having the higher relative priority. The operations of 1125 may be performed according to the methods described herein. In some examples, aspects of the operations of 1125 may be performed by a resource allocation mapping component as described with reference to FIGS. 6 through 9.

At 1130, the UE may select a new resource from the updated set of candidate resources for transmitting the first packet. The operations of 1130 may be performed according to the methods described herein. In some examples, aspects of the operations of 1130 may be performed by a packet scheduler as described with reference to FIGS. 6 through 9.

At 1135, the UE may communicate in the V2X system during the TTI by refraining from transmitting the first packet based on the second packet having the higher relative priority. The UE may instead receive the second packet during the TTI. The operations of 1135 may be performed according to the methods described herein. In some examples, aspects of the operations of 1135 may be performed by a communication component as described with reference to FIGS. 6 through 9.

Figure 12:
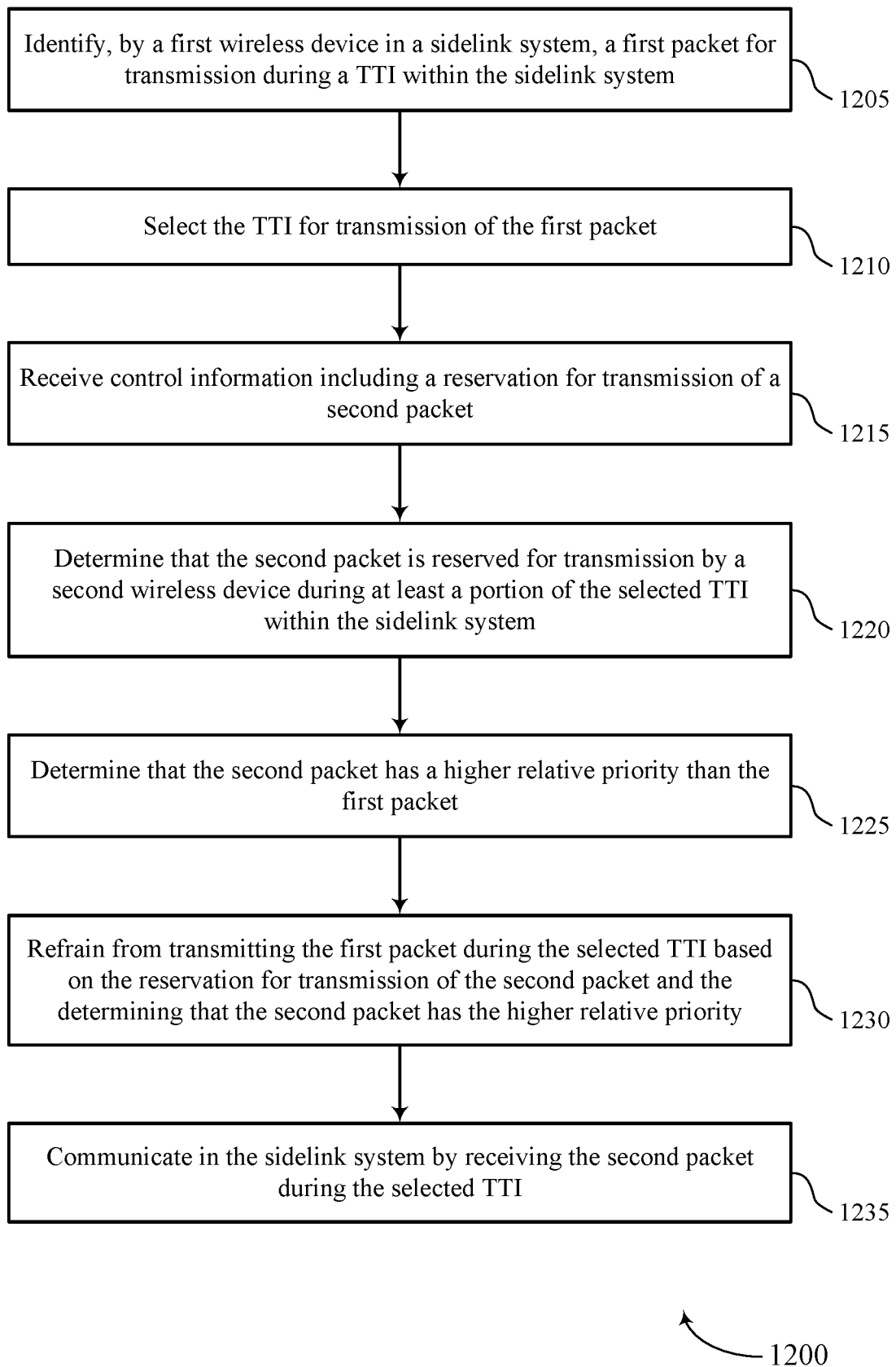

FIG. 12 shows a flowchart illustrating a method 1200 that supports handling packets with different priorities in sidelink systems in accordance with aspects of the present disclosure. The operations of method 1200 may be implemented by a first wireless device (e.g., a UE 115, such as a vehicle in a V2X system) or its components as described herein. For example, the operations of method 1200 may be performed by a V2X priority handling manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE (e.g., a first wireless device in a sidelink system) may identify a first packet for transmission during a TTI within the sidelink system. The operations of 1205 may be performed according to the methods described herein. In some examples, aspects of the operations of 1205 may be performed by a packet identifier as described with reference to FIGS. 6 through 9.

At 1210, the UE may select the TTI for transmission of the first packet. The operations of 1210 may be performed according to the methods described herein. In some examples, aspects of the operations of 1210 may be performed by a packet scheduler as described with reference to FIGS. 6 through 9.

At 1215, the UE may receive control information including a reservation for transmission of a second packet during at least a portion of the selected TTI. The operations of 1215 may be performed according to the methods described herein. In some examples, aspects of the operations of 1215 may be performed by a reservation reception component as described with reference to FIGS. 6 through 9.

At 1220, the UE may determine that the second packet is reserved for transmission by a second wireless device during at least the portion of the selected TTI within the sidelink system. The operations of 1220 may be performed according to the methods described herein. In some examples, aspects of the operations of 1220 may be performed by a reservation overlap identifier as described with reference to FIGS. 6 through 9.

At 1225, the UE may determine whether the first packet or the second packet has a higher relative priority. For example, the UE may determine that the second packet has a higher relative priority than the first packet. The operations of 1225 may be performed according to the methods described herein. In some examples, aspects of the operations of 1225 may be performed by a priority determination component as described with reference to FIGS. 6 through 9.

At 1230, the UE may refrain from transmitting the first packet during the selected TTI based on the reservation for transmission of the second packet and the determining that the second packet has a higher relative priority than the first packet. The operations of 1230 may be performed according to the methods described herein. In some examples, aspects of the operations of 1230 may be performed by a communication component as described with reference to FIGS. 6 through 9.

At 1235, the UE may communicate in the sidelink system during the selected TTI by receiving the second packet based on the second packet having the higher relative priority. The operations of 1235 may be performed according to the methods described herein. In some examples, aspects of the operations of 1235 may be performed by a communication component as described with reference to FIGS. 6 through 9.

Figure 13:
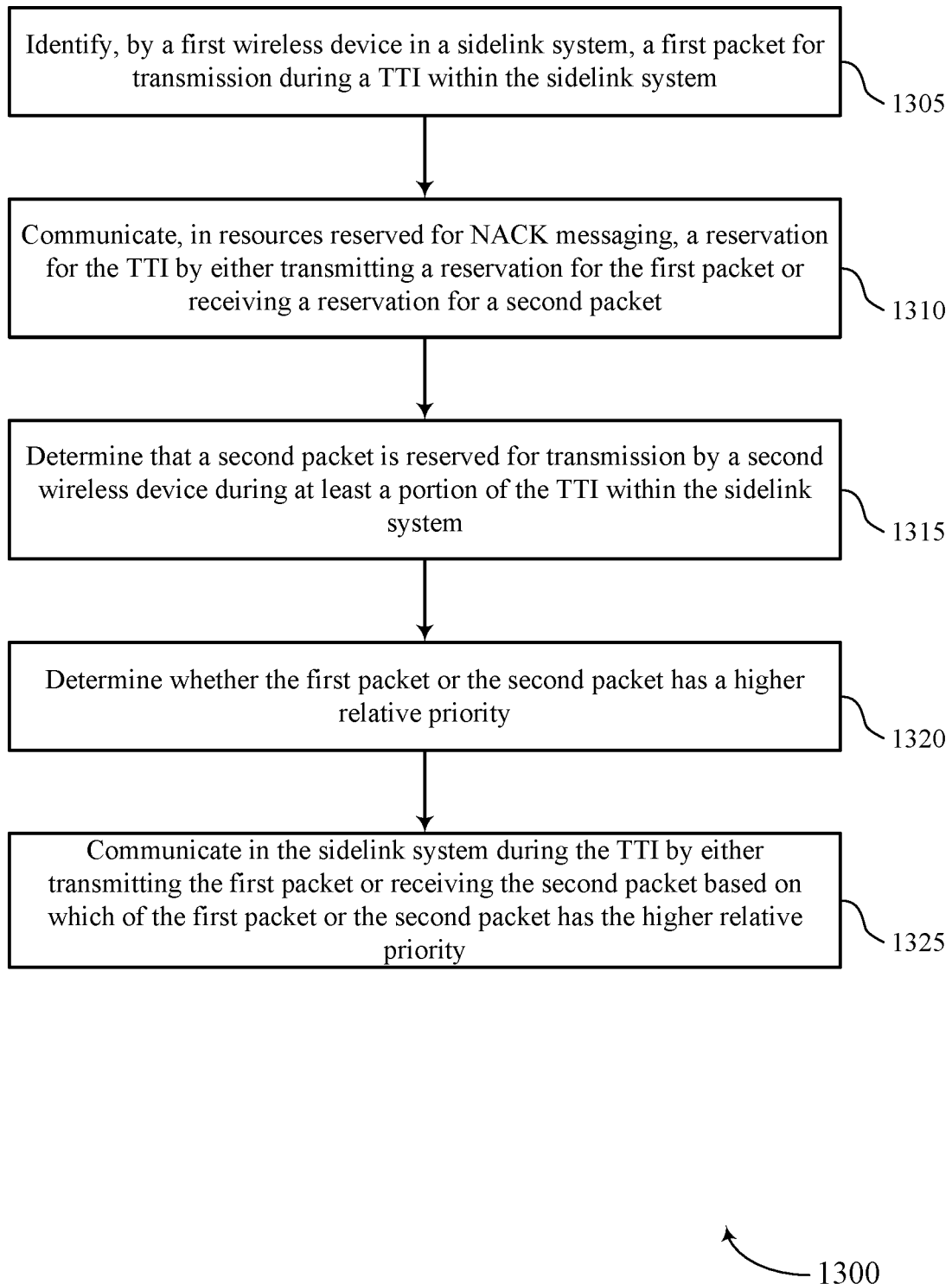

FIG. 13 shows a flowchart illustrating a method 1300 that supports handling packets with different priorities in sidelink systems in accordance with aspects of the present disclosure. The operations of method 1300 may be implemented by a first wireless device (e.g., a UE 115, such as a vehicle in a V2X system) or its components as described herein. For example, the operations of method 1300 may be performed by a V2X priority handling manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE (e.g., a first wireless device in a sidelink system) may identify a first packet for transmission during a TTI within the sidelink system. The operations of 1305 may be performed according to the methods described herein. In some examples, aspects of the operations of 1305 may be performed by a packet identifier as described with reference to FIGS. 6 through 9.

At 1310, the UE may communicate, in resources reserved for NACK messaging, a reservation for the TTI by either transmitting a reservation for the first packet or receiving a reservation for a second packet, where either determining that the first packet is to be transmitted during the TTI or determining that the second packet is reserved for transmission during at least a portion of the TTI is based on the reservation. The operations of 1310 may be performed according to the methods described herein. In some examples, aspects of the operations of 1310 may be performed by a NACK reservation component as described with reference to FIGS. 6 through 9.

At 1315, the UE may determine that the second packet is reserved for transmission by a second wireless device during at least a portion of the TTI within the sidelink system. The operations of 1315 may be performed according to the methods described herein. In some examples, aspects of the operations of 1315 may be performed by a reservation overlap identifier as described with reference to FIGS. 6 through 9.

At 1320, the UE may determine whether the first packet or the second packet has a higher relative priority. The operations of 1320 may be performed according to the methods described herein. In some examples, aspects of the operations of 1320 may be performed by a priority determination component as described with reference to FIGS. 6 through 9.

At 1325, the UE may communicate in the sidelink system during the TTI by either transmitting the first packet or receiving the second packet based on which of the first packet or the second packet has the higher relative priority. The operations of 1325 may be performed according to the methods described herein. In some examples, aspects of the operations of 1325 may be performed by a communication component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

A method for wireless communications is described. The method may include identifying (e.g., determining), by a first wireless device in a sidelink system (e.g., a V2X system), a first packet (e.g., a first data packet) for transmission during a TTI within the V2X system, identifying (e.g., determining) that a second packet (e.g., a second data packet) is reserved for transmission by a second wireless device during at least a portion of the TTI within the V2X system, determining whether the first data packet or the second data packet has a higher relative priority, and communicating in the V2X system during the TTI by either transmitting the first data packet or receiving the second data packet based on which data packet has the higher relative priority.

An apparatus for wireless communications is described. The apparatus may include a processor, memory in electronic communication with the processor, and instructions stored in the memory. The instructions may be executable by the processor to cause the apparatus to determine, by a first wireless device in a sidelink system, a first packet for transmission during a TTI within the sidelink system, determine that a second packet is reserved for transmission by a second wireless device during at least a portion of the TTI within the sidelink system, determine whether the first packet or the second packet has a higher relative priority, and communicate in the sidelink system during the TTI by either transmitting the first packet or receiving the second packet based on which packet has the higher relative priority.

Another apparatus for wireless communications is described. The apparatus may include means for determining, by a first wireless device in a sidelink system, a first packet for transmission during a TTI within the sidelink system, determining that a second packet is reserved for transmission by a second wireless device during at least a portion of the TTI within the sidelink system, determining whether the first packet or the second packet has a higher relative priority, and communicating in the sidelink system during the TTI by either transmitting the first packet or receiving the second packet based on which packet has the higher relative priority.

A non-transitory computer-readable medium storing code for wireless communications is described. The code may include instructions executable by a processor to determine, by a first wireless device in a sidelink system, a first packet for transmission during a TTI within the sidelink system, determine that a second packet is reserved for transmission by a second wireless device during at least a portion of the TTI within the sidelink system, determine whether the first packet or the second packet has a higher relative priority, and communicate in the sidelink system during the TTI by either transmitting the first packet or receiving the second packet based on which packet has the higher relative priority.

Some examples of the method, apparatuses, and non-transitory computer-readable medium described herein may further include operations, features, means, or instructions for receiving an indication that one or more resources of the TTI are reserved via a first reservation for the second packet.

Some examples of the method, apparatuses, and non-transitory computer-readable medium described herein may further include operations, features, means, or instructions for maintaining the one or more resources of the TTI in a set of candidate resources based on the first packet having the higher relative priority, where the communicating involves transmitting the first packet based on the first packet having the higher relative priority.

Some examples of the method, apparatuses, and non-transitory computer-readable medium described herein may further include operations, features, means, or instructions for updating a set of candidate resources to exclude the one or more resources of the TTI based on the second packet having the higher relative priority, refraining from transmitting the first packet during the one or more resources of the TTI based on the second packet having the higher relative priority, and selecting one or more updated resources of the updated set of candidate resources to transmit the first packet based on the refraining.

In some examples of the method, apparatuses, and non-transitory computer-readable medium described herein, the first packet may include a re-transmission of a packet with a higher relative priority than the second packet. In some such examples, the method, apparatuses, and non-transitory computer-readable medium may further include operations, features, means, or instructions for selecting the TTI to transmit the first packet based on the second packet having a lower relative priority than the first packet.

In some examples of the method, apparatuses, and non-transitory computer-readable medium described herein, the selecting further may include operations, features, means, or instructions for determining that a resource reservation includes one or more reserved transmissions such that any TTI selection for transmission of the first packet in the resource reservation overlaps with at least one reserved transmission of the one or more reserved transmissions and selecting the TTI to transmit the first packet such that the selected TTI at least partially overlaps in time with a reserved transmission of the second packet based on the determining that the resource reservation includes the one or more reserved transmissions.

Some examples of the method, apparatuses, and non-transitory computer-readable medium described herein may further include operations, features, means, or instructions for determining that a third packet may be reserved for transmission by a third wireless device during a different TTI than the selected TTI, where the first packet additionally may have a higher relative priority than the third packet, and determining that a first signal strength corresponding to a reservation for transmission of the second packet is less than a second signal strength corresponding to a reservation for transmission of the third packet, where the TTI is further selected such that the selected TTI is non-overlapping with the different TTI based on the determining that the first signal strength is less than the second signal strength.

In some examples of the method, apparatuses, and non-transitory computer-readable medium described herein, the second packet may include a re-transmission of a packet with a higher relative priority than the first packet. In some such examples, the method, apparatuses, and non-transitory computer-readable medium may further include operations, features, means, or instructions for selecting the TTI to transmit the first packet, receiving control information including a reservation for transmission of the second packet during at least the portion of the selected TTI, and refraining from transmitting the first packet during the selected TTI based on the reservation for transmission of the second packet and the determining whether the first packet or the second packet has the higher relative priority.

Some examples of the method, apparatuses, and non-transitory computer-readable medium described herein may further include operations, features, means, or instructions for communicating, in resources reserved for NACK messaging, a reservation for the TTI by either transmitting a reservation for the first packet or receiving a reservation for the second packet, where either determining the first packet for transmission during the TTI or determining that the second packet is reserved for transmission during at least the portion of the TTI may be based on the reservation.

In some examples of the method, apparatuses, and non-transitory computer-readable medium described herein, the first packet includes an initial transmission of a packet with a higher relative priority than the second packet, the communicating the reservation for the TTI includes transmitting the reservation for the first packet in the resources reserved for NACK messaging, and the communicating during the TTI includes transmitting the first packet based on the reservation for the TTI.

In some examples of the method, apparatuses, and non-transitory computer-readable medium described herein, the second packet includes an initial transmission of a packet with a higher relative priority than the first packet, and the communicating the reservation for the TTI includes receiving the reservation for the second packet in the resources reserved for NACK messaging. In some such examples, the method, apparatuses, and non-transitory computer-readable medium may further include refraining from transmitting the first packet during the TTI based on the reservation for the TTI, where the communicating during the TTI may further include receiving the second packet based on the reservation for the TTI.

In some examples of the method, apparatuses, and non-transitory computer-readable medium described herein, the second packet may be received within a pre-determined preemption time period.

Some examples of the method, apparatuses, and non-transitory computer-readable medium described herein may further include operations, features, means, or instructions for selecting the TTI to transmit the first packet such that the selected TTI is at least partially within the pre-determined preemption time period, refraining from transmitting a NACK message in the resources reserved for NACK messaging based on the selected TTI, and monitoring the resources reserved for NACK messaging for the reservation for the transmission time interval based on the refraining from transmitting the NACK message.

In some examples of the method, apparatuses, and non-transitory computer-readable medium described herein, the reservation for the TTI includes a dedicated sequence.

In some examples of the method, apparatuses, and non-transitory computer-readable medium described herein, the determining whether the first packet or the second packet has the higher relative priority includes determining that the first packet has a higher relative priority than the second packet and the communicating includes transmitting the first packet during the TTI.

In some examples of the method, apparatuses, and non-transitory computer-readable medium described herein, the determining whether the first packet or the second packet has the higher relative priority includes determining that the second packet has a higher relative priority than the first packet and the communicating includes receiving the second packet during the TTI.

In some examples of the method, apparatuses, and non-transitory computer-readable medium described herein, the TTI includes a set of slots.

Some examples of the method, apparatuses, and non-transitory computer-readable medium described herein may further include operations, features, means, or instructions for modifying a maximum re-transmission limit for a packet in the sidelink system based on a relative priority of the packet.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and managers described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying, by a first wireless device in a sidelink system, a first packet for transmission during a transmission time interval within the sidelink system;
   determining that a second packet is reserved for transmission by a second wireless device during at least a portion of the transmission time interval within the sidelink system;
   determining whether the first packet or the second packet has a higher relative priority;
   determining that a reference signal received power measurement associated with a reservation for the second packet by the second wireless device is greater than a reference signal received power threshold;
   receiving the second packet based at least in part on determining that the second packet has the higher relative priority and the reference signal received power measurement being greater than the reference signal received power threshold; and
   selecting one or more updated resources of an updated set of candidate resources to transmit the first packet based at least in part on the reference signal received power measurement being greater than the reference signal received power threshold.

2. The method of claim 1, wherein the determining that the second packet is reserved for transmission by the second wireless device further comprises:
   receiving an indication that one or more resources of the transmission time interval are reserved via a first reservation for the second packet.

3. The method of claim 2, further comprising:
   excluding the one or more resources of the transmission time interval from the updated set of candidate resources based at least in part on the second packet having the higher relative priority;
   refraining from transmitting the first packet during the one or more resources of the transmission time interval based at least in part on the second packet having the higher relative priority.

4. The method of claim 1, wherein the second packet comprises a re-transmission of a packet with the higher relative priority than the first packet, the method further comprising:
   selecting the transmission time interval to transmit the first packet;
   receiving control information comprising a reservation for transmission of the second packet during at least the portion of the selected transmission time interval; and
   refraining from transmitting the first packet during the selected transmission time interval based at least in part on the reservation for transmission of the second packet, the determining that the second packet has the higher relative priority, and the reference signal received power measurement being greater than the reference signal received power threshold.

5. The method of claim 1, further comprising:
   communicating, in resources reserved for negative acknowledgment messaging, a reservation for the transmission time interval by either transmitting a first reservation for the first packet or receiving a second reservation for the second packet, wherein either determining the first packet for transmission during the transmission time interval or determining that the second packet is reserved for transmission during at least the portion of the transmission time interval is based at least in part on the reservation of the first packet or the reservation of the second packet.

6. The method of claim 5, wherein the reservation for the transmission time interval comprises a dedicated sequence.

7. The method of claim 1, wherein the transmission time interval comprises a plurality of slots.

8. The method of claim 1, further comprising:
   modifying a maximum re-transmission limit for a packet in the sidelink system based at least in part on a relative priority of the packet.

9. An apparatus for wireless communications, comprising:
   a transceiver;
   at least one memory; and
   at least one processor in electronic communication with the at least one memory and the transceiver, and responsive to instructions stored in the at least one memory and executable by the at least one processor to cause the apparatus to:
      identify, by a first wireless device in a sidelink system, a first packet for transmission during a transmission time interval within the sidelink system;
      determine that a second packet is reserved for transmission by a second wireless device during at least a portion of the transmission time interval within the sidelink system;
      determine whether the first packet or the second packet has a higher relative priority;
      determine that a reference signal received power measurement associated with a reservation for the second packet by the second wireless device is greater than a reference signal received power threshold;
      receive the second packet based at least in part on determining that the second packet has the higher relative priority and the reference signal received power measurement being greater than the reference signal received power threshold; and
      select one or more updated resources of an updated set of candidate resources to transmit the first packet based at least in part on the reference signal received power measurement being greater than the reference signal received power threshold.

10. The apparatus of claim 9, wherein the instructions to determine that the second packet is reserved for transmission by the second wireless device are further executable by the at least one processor to cause the apparatus to:

receive, via the transceiver, an indication that one or more resources of the transmission time interval are reserved via a first reservation for the second packet.

11. The apparatus of claim 10, wherein the instructions are further executable by the at least one processor to cause the apparatus to:

excluding the one or more resources of the transmission time interval from the updated set of candidate resources based at least in part on the second packet having the higher relative priority;

refrain from transmission, via the transceiver, of the first packet during the one or more resources of the transmission time interval based at least in part on the second packet having the higher relative priority; and select the one or more updated resources of the updated set of candidate resources to transmit the first packet based at least in part on the refraining and the reference signal received power measurement being greater than the reference signal received power threshold.

12. The apparatus of claim 9, wherein a reservation for the transmission time interval is communicated via the transceiver by at least one of transmission of a first reservation for the first packet or reception of a second reservation for the second packet, and wherein at least one of the first packet for transmission during the transmission time interval is identified or the second packet is determined as being reserved for transmission during at least the portion of the transmission time interval based at least in part on the reservation as communicated.

13. The apparatus of claim 12, wherein the reservation for the transmission time interval comprises a dedicated sequence.

14. The apparatus of claim 9, wherein the transmission time interval comprises a plurality of slots.

15. An apparatus for wireless communications, comprising:

means for identifying, by a first wireless device in a sidelink system, a first packet for transmission during a transmission time interval within the sidelink system;

means for determining that a second packet is reserved for transmission by a second wireless device during at least a portion of the transmission time interval within the sidelink system;

means for determining whether the first packet or the second packet has a higher relative priority;

means for determining that a reference signal received power measurement associated with a reservation for the second packet by the second wireless device is greater than a reference signal received power threshold;

means for receiving the second packet based at least in part on determining that the second packet has the higher relative priority and the reference signal received power measurement being greater than the reference signal received power threshold; and means for selecting one or more updated resources of an updated set of candidate resources to transmit the first packet based at least in part on the reference signal received power measurement being greater than the reference signal received power threshold.

16. A non-transitory computer-readable medium storing code for wireless communications, the code comprising instructions executable by a processor to:

identify, by a first wireless device in a sidelink system, a first packet for transmission during a transmission time interval within the sidelink system;

determine that a second packet is reserved for transmission by a second wireless device during at least a portion of the transmission time interval within the sidelink system;

determine whether the first packet or the second packet has a higher relative priority;

determine that a reference signal received power measurement associated with a reservation for the second packet by the second wireless device is greater than a reference signal received power threshold;

receive the second packet based at least in part on determining that the second packet has the higher relative priority and the reference signal received power measurement being greater than the reference signal received power threshold; and select one or more updated resources of an updated set of candidate resources to transmit the first packet based at least in part on the reference signal received power measurement being greater than the reference signal received power threshold.

* * * * *